(12) United States Patent
Dallal et al.

(10) Patent No.: US 11,799,710 B2
(45) Date of Patent: Oct. 24, 2023

(54) TECHNIQUES FOR SIGNALING A SOURCE OF DOMINANT NOISE AT A USER EQUIPMENT

(71) Applicant: QUALCOMM Incorporated, San Diego, CA (US)

(72) Inventors: Yehonatan Dallal, Kfar Saba (IL); Ran Berliner, Kfar-Aviv (IL); Idan Michael HOrn, Hod Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 270 days.

(21) Appl. No.: 17/117,264

(22) Filed: Dec. 10, 2020

(65) Prior Publication Data

US 2022/0191083 A1   Jun. 16, 2022

(51) Int. Cl.
| | |
|---|---|
| *H04L 27/36* | (2006.01) |
| *H04B 17/336* | (2015.01) |
| *H04B 7/01* | (2006.01) |
| *H04W 8/24* | (2009.01) |
| *H04W 24/10* | (2009.01) |

(52) U.S. Cl.
CPC ............. *H04L 27/366* (2013.01); *H04B 7/01* (2013.01); *H04B 17/336* (2015.01); *H04L 27/364* (2013.01); *H04W 8/245* (2013.01); *H04W 24/10* (2013.01)

(58) Field of Classification Search
CPC ...... H04B 1/0475; H04B 17/336; H04B 7/01; H04L 1/003; H04L 1/0015; H04L 1/0025; H04L 1/0035; H04L 25/0202; H04L 27/0008; H04L 27/364; H04L 27/366; H04L 5/001; H04W 24/10; H04W 8/245
See application file for complete search history.

(56) References Cited

U.S. PATENT DOCUMENTS

| | | | |
|---|---|---|---|
| 8,180,300 B2 * | 5/2012 | Takano | H04B 17/21 |
| | | | 455/562.1 |
| 9,408,245 B2 * | 8/2016 | Bodduru | H04W 48/16 |

(Continued)

OTHER PUBLICATIONS

U.S. Appl. No. 63/074,191 (Year: 2020).*
International Search Report and Written Opinion—PCT/US2021/058997—ISA/EPO—dated Feb. 25, 2022.

*Primary Examiner* — Dung B Huynh
(74) *Attorney, Agent, or Firm* — Holland & Hart / Qualcomm

(57) ABSTRACT

This disclosure provides methods, devices and systems for pre-compensation of downlink communication based on a transmission of a request for the pre-compensation from a user equipment (UE). For example, the UE may determine an impairment at the UE that has a greater severity (a greater impact on downlink communication) or is associated with a greater amount of resources for processing relative to a remainder of a set of impairments that is experienced at the UE and the UE may transmit a request for pre-compensation of the impairment by a base station. The base station may transmit feedback to the UE indicating a confirmation of pre-compensation for the impairment by the base station or to deferment of compensation for the impairment back to the UE. If the base station acknowledges pre-compensation for the impairment, the base station may pre-compensate a downlink transmission to the UE for the impairment.

30 Claims, 18 Drawing Sheets

(56) References Cited

U.S. PATENT DOCUMENTS

| | | | | |
|---|---|---|---|---|
| 9,491,276 | B2* | 11/2016 | Kanamarlapudi | H04B 1/3816 |
| 10,560,305 | B1* | 2/2020 | Bonen | H03F 3/24 |
| 11,189,202 | B1* | 11/2021 | Chang | G09G 3/3233 |
| 11,477,752 | B1* | 10/2022 | Harrebek | H04W 64/00 |
| 2004/0213196 | A1* | 10/2004 | Deng | H04B 7/0617 370/335 |
| 2006/0240826 | A1* | 10/2006 | Shinozaki | H04L 1/203 455/436 |
| 2007/0060093 | A1* | 3/2007 | Kerth | H04W 52/028 455/296 |
| 2007/0070972 | A1* | 3/2007 | Wang | H04L 12/189 370/349 |
| 2008/0004030 | A1* | 1/2008 | Frederiksen | H04W 24/10 455/450 |
| 2008/0143562 | A1* | 6/2008 | Huang | H04L 27/364 341/118 |
| 2008/0242240 | A1* | 10/2008 | Rofougaran | H04B 1/406 455/73 |
| 2010/0075605 | A1* | 3/2010 | Yoneda | H04M 1/72412 455/41.3 |
| 2010/0219889 | A1* | 9/2010 | Nagatani | H03F 1/3258 330/149 |
| 2010/0232393 | A1* | 9/2010 | Shuai | H04W 36/0066 370/331 |
| 2010/0248615 | A1* | 9/2010 | Oguchi | H04W 36/30 455/7 |
| 2011/0075611 | A1* | 3/2011 | Choi | H04L 1/0001 714/748 |
| 2011/0182230 | A1* | 7/2011 | Ohm | H04B 7/185 370/328 |
| 2012/0099473 | A1* | 4/2012 | Ma | H04W 24/04 370/252 |
| 2012/0252472 | A1* | 10/2012 | Nakahara | H04W 76/10 455/450 |
| 2012/0284193 | A1* | 11/2012 | Bharghavan | H04L 9/3263 705/16 |
| 2013/0148590 | A1* | 6/2013 | Hu | H04W 72/04 370/329 |
| 2013/0208776 | A1* | 8/2013 | Svensson | H04L 27/366 375/224 |
| 2013/0235962 | A1* | 9/2013 | O'Keefe | H04B 17/12 375/371 |
| 2013/0285627 | A1* | 10/2013 | Chae | G05F 1/46 323/271 |
| 2014/0037018 | A1* | 2/2014 | Kwon | H04L 27/3863 375/260 |
| 2014/0051446 | A1* | 2/2014 | Rose | H04W 52/0274 455/436 |
| 2014/0171111 | A1* | 6/2014 | Xiao | H04W 64/00 455/456.1 |
| 2014/0258391 | A1* | 9/2014 | Sun | H04L 65/1093 709/203 |
| 2015/0043437 | A1* | 2/2015 | Chakraborty | H04W 52/243 370/329 |
| 2015/0092738 | A1 | 4/2015 | Chakraborty et al. | |
| 2015/0117395 | A1* | 4/2015 | Hadani | H04W 24/02 370/330 |
| 2015/0257013 | A1* | 9/2015 | Patel | H04W 48/10 370/252 |
| 2016/0150420 | A1* | 5/2016 | Byun | H04W 16/08 370/312 |
| 2016/0192262 | A1* | 6/2016 | Comstock | H04W 52/0209 370/331 |
| 2016/0219535 | A1* | 7/2016 | Zhang | H04W 56/00 |
| 2016/0249350 | A1* | 8/2016 | Koutsimanis | H04W 16/14 |
| 2016/0255662 | A1* | 9/2016 | Kotecha | H04W 76/12 370/254 |
| 2016/0309379 | A1* | 10/2016 | Pelletier | H04W 24/08 |
| 2016/0337876 | A1* | 11/2016 | Östrup | H04W 76/27 |
| 2017/0078963 | A1* | 3/2017 | Qi | H04W 4/70 |
| 2017/0244513 | A1* | 8/2017 | Pitakdumrongkija | H04B 7/0452 |
| 2017/0245172 | A1* | 8/2017 | Yoon | G10L 19/005 |
| 2018/0102827 | A1* | 4/2018 | Noh | H04B 7/0695 |
| 2018/0183554 | A1 | 6/2018 | Lim et al. | |
| 2018/0279311 | A1* | 9/2018 | Yoo | H04B 17/11 |
| 2018/0302866 | A1* | 10/2018 | Zhang | H04L 25/03343 |
| 2019/0037502 | A1* | 1/2019 | Tang | H04L 5/14 |
| 2019/0115785 | A1* | 4/2019 | Kallamkote | H04L 67/125 |
| 2019/0141638 | A1* | 5/2019 | Li | H04W 52/247 |
| 2019/0181934 | A1* | 6/2019 | Kang | H04W 72/0406 |
| 2019/0223229 | A1* | 7/2019 | Sharma | H04W 76/18 |
| 2019/0238247 | A1* | 8/2019 | Lee | H04L 27/12 |
| 2019/0274117 | A1* | 9/2019 | Zhang | H04W 68/00 |
| 2019/0380055 | A1* | 12/2019 | Onishi | H04B 7/15528 |
| 2020/0007379 | A1* | 1/2020 | Patil | H04L 27/06 |
| 2020/0022142 | A1* | 1/2020 | Wang | H04W 52/243 |
| 2020/0029297 | A1* | 1/2020 | Baek | H04W 76/11 |
| 2020/0045674 | A1* | 2/2020 | Tseng | H04W 72/048 |
| 2020/0195489 | A1* | 6/2020 | Wang | H03F 3/181 |
| 2020/0196160 | A1* | 6/2020 | Chiang | H04B 17/14 |
| 2020/0229076 | A1* | 7/2020 | Jin | H04W 8/245 |
| 2020/0328839 | A1* | 10/2020 | Zhang | H04W 72/51 |
| 2021/0029624 | A1* | 1/2021 | Liu | H04W 88/14 |
| 2021/0049633 | A1* | 2/2021 | Wang | G06Q 30/0213 |
| 2021/0049773 | A1* | 2/2021 | Paxton | G06T 7/248 |
| 2021/0068020 | A1* | 3/2021 | Ke | H04W 36/0022 |
| 2021/0084688 | A1* | 3/2021 | Ly | H04L 5/0091 |
| 2021/0100038 | A1* | 4/2021 | Ly | H04W 56/0015 |
| 2021/0182997 | A1* | 6/2021 | Klingemann | G06Q 50/28 |
| 2021/0185513 | A1* | 6/2021 | Liu | H04W 76/10 |
| 2021/0314034 | A1* | 10/2021 | Yin | H04B 7/0469 |
| 2021/0320685 | A1* | 10/2021 | Venugopal | H04L 5/0048 |
| 2021/0320694 | A1* | 10/2021 | Zhong | H04L 25/03343 |
| 2021/0341558 | A1* | 11/2021 | Paul | G01R 33/56554 |
| 2022/0014412 | A1* | 1/2022 | Yunusov | H04L 27/3863 |
| 2022/0061120 | A1* | 2/2022 | Deng | H04W 4/44 |
| 2022/0069901 | A1* | 3/2022 | Tian | H04L 1/0004 |
| 2022/0078703 | A1* | 3/2022 | Xia | H04W 76/15 |
| 2022/0078745 | A1* | 3/2022 | Siomina | G01S 5/021 |
| 2022/0095404 | A1* | 3/2022 | Husted | H04W 52/246 |
| 2022/0104160 | A1* | 3/2022 | Tang | H04W 56/00 |
| 2022/0109499 | A1* | 4/2022 | Hu | H04W 56/001 |
| 2022/0116256 | A1* | 4/2022 | Shahmohammadian | H04L 5/0048 |
| 2022/0132593 | A1* | 4/2022 | Ren | H04W 72/0446 |
| 2022/0159689 | A1* | 5/2022 | Huang | H04L 5/0051 |
| 2022/0167287 | A1* | 5/2022 | Park | H04W 28/04 |
| 2022/0167438 | A1* | 5/2022 | Shrestha | H04W 76/20 |
| 2022/0216912 | A1* | 7/2022 | Hu | H04W 72/1289 |
| 2022/0217727 | A1* | 7/2022 | Dallal | H04W 80/02 |
| 2022/0224461 | A1* | 7/2022 | Lee | H04L 5/0082 |
| 2022/0225432 | A1* | 7/2022 | Wang | H04W 56/001 |
| 2022/0240208 | A1* | 7/2022 | Chien | H04W 56/0045 |
| 2022/0260666 | A1* | 8/2022 | Arngren | H04W 64/00 |
| 2022/0271802 | A1* | 8/2022 | Lee | H04B 17/11 |
| 2022/0279402 | A1* | 9/2022 | Zheng | H04W 36/0088 |
| 2022/0286342 | A1* | 9/2022 | Johnson | H04B 7/024 |
| 2022/0303909 | A1* | 9/2022 | Kwon | H04W 52/14 |
| 2022/0330039 | A1* | 10/2022 | Wang | H04W 24/10 |
| 2022/0353892 | A1* | 11/2022 | Cirik | H04L 5/0096 |
| 2023/0022798 | A1* | 1/2023 | Li | H04B 7/2041 |
| 2023/0032220 | A1* | 2/2023 | Guo | H04W 12/37 |
| 2023/0032301 | A1* | 2/2023 | Hong | H04L 5/0094 |
| 2023/0111603 | A1* | 4/2023 | Ghimire | H04B 7/0421 455/456.1 |
| 2023/0164698 | A1* | 5/2023 | Ren | H04W 52/244 455/522 |
| 2023/0171704 | A1* | 6/2023 | Hu | H04W 52/241 455/522 |
| 2023/0199669 | A1* | 6/2023 | Vannithamby | H04W 52/0225 455/127.1 |
| 2023/0246781 | A1* | 8/2023 | Kim | H04B 7/06 370/329 |

* cited by examiner

TECHNIQUES FOR SIGNALING A SOURCE OF DOMINANT NOISE AT A USER EQUIPMENT

TECHNICAL FIELD

The following relates to wireless communications, including techniques for signaling a source of dominant noise at a user equipment (UE).

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may experience impairments that adversely impact downlink communication from a base station. Such impairments may limit performance of the UE by reducing the likelihood for the UE to successfully receive and decode the downlink communication from the base station.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication at a user equipment (UE). The method may include initiating a connection establishment procedure with a base station, receiving, from the base station, a capability report indicating one or more first communication factors for which the base station is capable of compensating downlink communication, measuring a downlink channel between the base station and the UE for information associated with a set of communication factors, and transmitting, to the base station, an indication of one or more second communication factors from the set of communication factors based on the information associated with the set of communication factors.

Another innovative aspect of the subject matter described in this disclosure can be implemented in an apparatus for wireless communication at a UE. The apparatus may include a processor, memory coupled with the processor, and instructions stored in the memory. The instructions may be executable by the processor to cause the apparatus to initiate a connection establishment procedure with a base station, receive, from the base station, a capability report indicating one or more first communication factors for which the base station is capable of compensating downlink communication, measure a downlink channel between the base station and the UE for information associated with a set of communication factors, and transmit, to the base station, an indication of one or more second communication factors from the set of communication factors based on the information associated with the set of communication factors.

Another innovative aspect of the subject matter described in this disclosure can be implemented in another apparatus for wireless communication at a UE. The apparatus may include means for initiating a connection establishment procedure with a base station, means for receiving, from the base station, a capability report indicating one or more first communication factors for which the base station is capable of compensating downlink communication, means for measuring a downlink channel between the base station and the UE for information associated with a set of communication factors, and means for transmitting, to the base station, an indication of one or more second communication factors from the set of communication factors based on the information associated with the set of communication factors.

Another innovative aspect of the subject matter described in this disclosure can be implemented in a non-transitory computer-readable medium storing code for wireless communication at a UE. The code may include instructions executable by a processor to initiate a connection establishment procedure with a base station, receive, from the base station, a capability report indicating one or more first communication factors for which the base station is capable of compensating downlink communication, measure a downlink channel between the base station and the UE for information associated with a set of communication factors, and transmit, to the base station, an indication of one or more second communication factors from the set of communication factors based on the information associated with the set of communication factors.

Some examples of the method, apparatuses, and non-transitory computer-readable medium described herein may further include operations, features, means, or instructions for receiving, from the base station, a downlink transmission that may be compensated for at least one of the one or more second communication factors. In such examples of the method, apparatuses, and non-transitory computer-readable medium described herein, the one or more second communication factors include a subset of the one or more first communication factors.

In some examples of the method, apparatuses, and non-transitory computer-readable medium described herein, the capability report indicates that the base station compensates the downlink communication for the one or more first communication factors and the method, apparatuses, and non-transitory computer-readable medium may include further operations, features, means, or instructions for receiving, from the base station, a downlink transmission that may be compensated for the one or more first communication factors and for at least one of the one or more second communication factors. In such examples of the method, apparatuses, and non-transitory computer-readable medium described herein, the one or more second communication factors may be different than the one or more first communication factors.

In some examples of the method, apparatuses, and non-transitory computer-readable medium described herein, transmitting the indication of the one or more second communication factors may include operations, features, means, or instructions for transmitting the indication of the one or more second communication factors based on a severity of each of the set of communication factors. In such examples of the method, apparatuses, and non-transitory computer-readable medium described herein, the severity of each of the set of communication factors may be based on measuring the downlink channel for the information associated with the set of communication factors.

In some examples of the method, apparatuses, and non-transitory computer-readable medium described herein, transmitting the indication of the one or more second communication factors may include operations, features, means, or instructions for transmitting the indication of the one or more second communication factors based on estimating an amount of resources to be used to process each of the set of communication factors.

One innovative aspect of the subject matter described in this disclosure can be implemented in a method for wireless communication at a base station. The method may include initiating a connection establishment procedure with a UE, transmitting, to the UE, a capability report indicating one or more first communication factors for which the base station is capable of compensating downlink communication to the UE, receiving, from the UE, an indication of one or more second communication factors from a set of communication factors based on a downlink channel between the base station and the UE, and transmitting, to the UE, a downlink transmission that is compensated for at least one of the one or more second communication factors.

Another innovative aspect of the subject matter described in this disclosure can be implemented in an apparatus for wireless communication at a base station. The apparatus may include a processor, memory coupled with the processor, and instructions stored in the memory. The instructions may be executable by the processor to cause the apparatus to initiate a connection establishment procedure with a UE, transmit, to the UE, a capability report indicating one or more first communication factors for which the base station is capable of compensating downlink communication to the UE, receive, from the UE, an indication of one or more second communication factors from a set of communication factors based on a downlink channel between the base station and the UE, and transmit, to the UE, a downlink transmission that is compensated for at least one of the one or more second communication factors.

Another innovative aspect of the subject matter described in this disclosure can be implemented in another apparatus for wireless communication at a base station. The apparatus may include means for initiating a connection establishment procedure with a UE, means for transmitting, to the UE, a capability report indicating one or more first communication factors for which the base station is capable of compensating downlink communication to the UE, means for receiving, from the UE, an indication of one or more second communication factors from a set of communication factors based on a downlink channel between the base station and the UE, and means for transmitting, to the UE, a downlink transmission that is compensated for at least one of the one or more second communication factors.

Another innovative aspect of the subject matter described in this disclosure can be implemented in a non-transitory computer-readable medium storing code for wireless communication at a base station. The code may include instructions executable by a processor to initiate a connection establishment procedure with a UE, transmit, to the UE, a capability report indicating one or more first communication factors for which the base station is capable of compensating downlink communication to the UE, receive, from the UE, an indication of one or more second communication factors from a set of communication factors based on a downlink channel between the base station and the UE, and transmit, to the UE, a downlink transmission that is compensated for at least one of the one or more second communication factors.

Some examples of the method, apparatuses, and non-transitory computer-readable medium described herein may further include operations, features, means, or instructions for determining that the one or more second communication factors will use a greater amount of resources for processing at the UE relative to a remainder of the set of communication factors. In such examples of the method, apparatuses, and non-transitory computer-readable medium described herein, transmitting the downlink transmission that may be compensated for at least the one of the one or more second communication factors may be based on the determining.

In some examples of the method, apparatuses, and non-transitory computer-readable medium described herein, determining that the one or more second communication factors will use the greater amount of resources for processing at the UE relative to the remainder of the set of communication factors may include operations, features, means, or instructions for determining that the one or more second communication factors will use a greater amount of resources for processing at the UE than for processing at the base station.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

Like reference numbers and designations in the various drawings indicate like elements.

DETAILED DESCRIPTION

Figure 1:
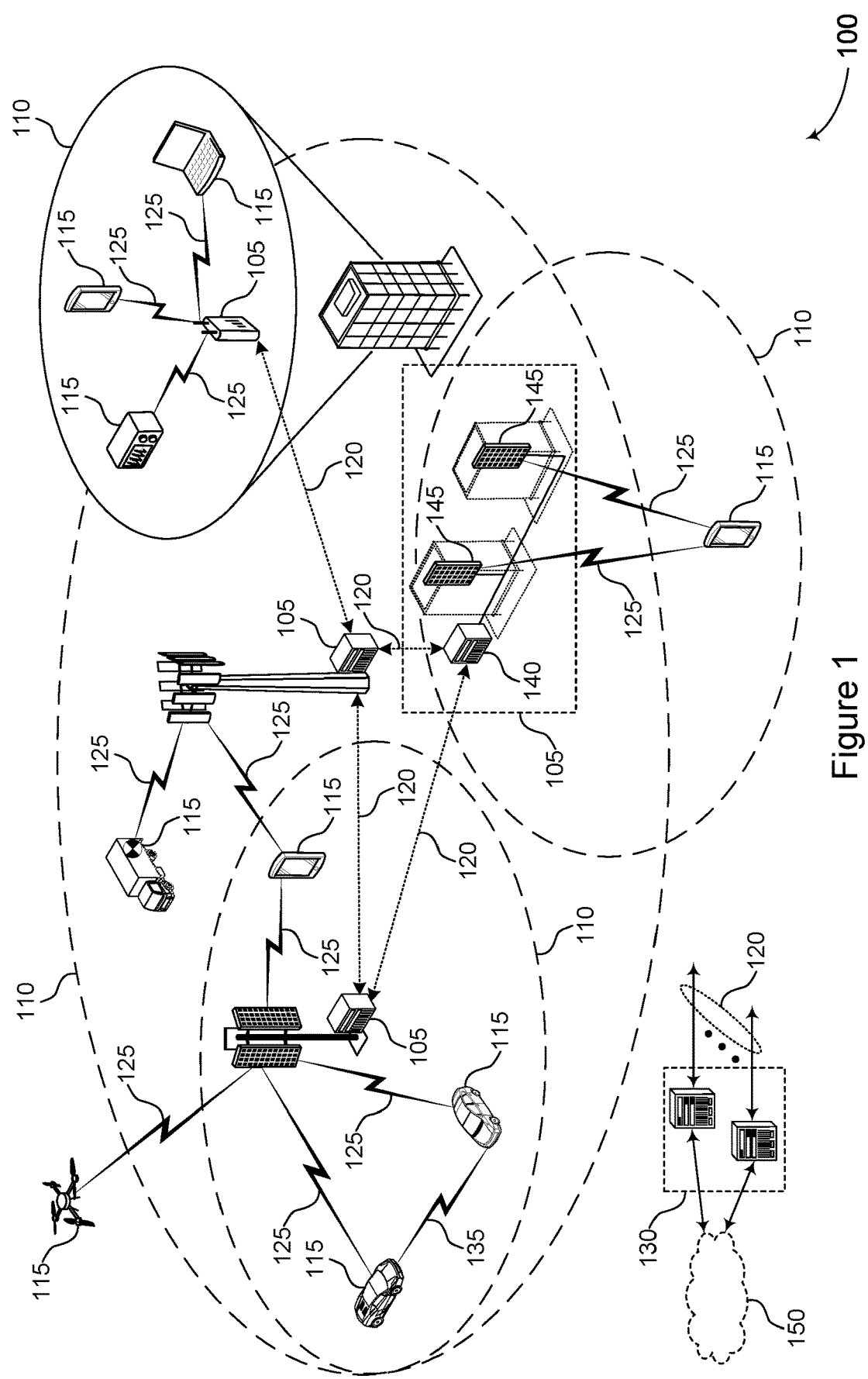
FIG. 1 illustrates an example of a wireless communications system that supports techniques for signaling a source of dominant noise at a user equipment (UE) in accordance with aspects of the present disclosure.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (TOT) network.

In some wireless communication systems, a user equipment (UE) may communicate with a base station over a downlink channel and, in some cases, may experience impairments that decrease a reliability of downlink communication between the base station and the UE over the downlink channel. Such impairments may be examples of any communication factors that adversely impact the likelihood of the UE to successfully receive downlink communication from the base station. For example, an impairment or a communication factor may include (or otherwise refer to a detriment caused by) phase noise, a spur, a Doppler shift, a frequency offset, or an in-phase and quadrature-phase (IQ) mismatch, among other examples. The UE may compensate for such impairments (for example, perform a processing operation to mitigate or reduce such impairments or the effects of such impairments). In some cases, however, such compensation for impairments at the UE may result in a higher processing cost or an increase in power consumption, which may negatively impact UE performance in some scenarios. For example, in scenarios in which the UE is in a low power state, the UE may refrain from compensating for an impairment based on the relatively large power consumption associated with compensation for the impairment, which may lower the likelihood for successful decoding of a downlink transmission at the UE.

Various implementations relate generally to the coordination and division of compensation of downlink communication for impairments experienced at the UE between the base station and the UE. Some implementations more specifically relate to a transmission, from the UE to the base station, of an impairment report requesting pre-compensation of downlink communication (for example, downlink communication that is compensated for one or more impairments experienced at the UE before or during transmission from the base station) for some of the impairments experienced by the UE. For example, the UE may determine one or more impairments based on measuring the downlink channel between the base station and the UE or based on a configuration of the UE and the UE may request, for example via the impairment report, the base station to pre-compensate downlink communication for a subset of the impairments determined by the UE. In some aspects, the UE may request pre-compensation of downlink communication by the base station for an impairment because the impairment limits the performance of the UE more severely than other impairments (and because compensation for such a more severe impairment may be correlated with a relatively larger power consumption or a relatively higher complexity at the UE). Additionally or alternatively, the UE may request pre-compensation for an impairment because the impairment is associated with a higher processing cost at the UE relative to other impairments. Additionally or alternatively, the UE may request pre-compensation for an impairment because the UE is unable to compensate for the impairment (based on a UE capability), or because the base station may potentially compensate for the impairment more effectively (or efficiently, in terms of processing complexity or power consumption) than the UE, or both.

In some implementations, the UE may transmit the impairment report to the base station based on receiving a capability report from the base station. For example, the base station may transmit the capability report to the base station indicating a list of impairments for which the base station may pre-compensate downlink communication to the UE based on a UE request. In such examples, the UE may transmit the impairment report requesting pre-compensation for an impairment (or multiple impairments) from the list of impairments. Alternatively, the base station may transmit the capability report to the UE indicating a list of impairments for which the base station actively (currently or previously) pre-compensates downlink communication to the UE. In such examples, the UE may transmit the impairment report requesting pre-compensation for an impairment (or multiple impairments) in addition to the impairments included in the list of impairments. In response to the impairment report, the base station may transmit feedback to the UE indicating an acknowledgement that the base station will pre-compensate for a requested impairment or a deferment of compensation for a requested impairment back to the UE. As such, the base station may transmit a downlink transmission to the UE that is pre-compensated for at least the requested and acknowledged impairments and the UE may compensate or process the downlink transmission for at least the requested and deferred impairments.

Particular implementations of the subject matter described in this disclosure can be implemented to realize one or more of the following potential advantages. In some implementations, the described techniques can be used to provide for more efficient usage of base station processing power, lower UE power consumption, and lower UE receiver design complexity (and likewise lower UE cost). For example, based on implementing the described techniques, the base station and the UE may coordinate on which device compensates for which impairments via the signaling of the capability report, the impairment report, and the feedback responsive to the impairment report. The base station and the UE, based on such coordination, may divide compensation tasks between the two devices based on the relative processing power or effectiveness of the two devices at compensating for an impairment experienced at the UE. Further, pre-compensation for select impairments may improve the reliability of downlink communication between the base station and the UE, which may result in a greater likelihood for successful communication between the base station and the UE. As such, the base station and the UE may experience greater spectral efficiency, greater system throughput, and higher data rates, among other benefits.

Aspects of the disclosure are initially described in the context of wireless communications systems. Additionally, aspects of the disclosure are illustrated by and described with reference to a process flow. Aspects of the disclosure are further illustrated by and described with reference to apparatus diagrams, system diagrams, and flowcharts that relate to techniques for signaling a source of dominant noise at a UE.

FIG. 1 illustrates an example of a wireless communications system 100 that supports techniques for signaling a source of dominant noise at a UE in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or another network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or another interface). The base stations 105 may communicate with one another over the backhaul links 120 (for example, via an X2, Xn, or another interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology. Such a "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode in which initial acquisition and connection may be conducted by the UEs 115 via the carrier, or the carrier may be operated in a non-standalone mode in which a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (for example, a duration of one modulation symbol) and one subcarrier, and the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, in which $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode if not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. If operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), in which multiple spatial layers are transmitted to the same receiving device, and multiple-user MIMO (MU-MIMO), in which multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) if receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, if receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, in which the device may provide HARQ feedback in a specific slot for data received in a previous symbol in the slot. In other cases, the device may provide HARQ feedback in a subsequent slot, or according to some other time interval.

A UE 115 may establish a connection with a base station 105 (for example, via a communication link 125) and may communicate with the base station 105 over a downlink channel. In some examples, the UE 115 may experience impairments that limit the performance of the UE 115 based on reducing a reliability of downlink communication between the base station 105 and the UE 115. Such impairments may be examples of any communication factors that adversely impact the likelihood of the UE to successfully receive downlink communication from the base station. For example, an impairment or a communication factor may include (or otherwise refer to a detriment caused by) phase noise, a spur, a Doppler shift, a frequency offset, or an IQ mismatch, among other examples. As such, phase noise, spurs, Doppler shifts, frequency offsets, and IQ mismatches may lower the likelihood for the UE 115 to successfully receive downlink communication from the base station 105.

The UE 115 may determine or otherwise identify which impairments are present or afflicting the UE 115 based on measuring the downlink channel between the base station 105 and the UE 115 or based on a configuration of the UE 115 and, in some aspects, the UE 115 may employ a receiver design (such as a complex received design) to compensate for the determined impairments. In some cases, however, such compensation for the determined impairments (such as for all of the determined impairments) at the UE 115 may be associated with a relatively higher power cost, which may adversely affect a battery life of the UE 115. Additionally or alternatively, the UE 115 may employ a receiver design that is unable to compensate for the measured impairments or the UE 115 may be in a mode or a state (such as a low power mode or state) such that the UE 115 may be unable to compensate for the measured impairments (because, for example, of the high power cost associated with the compensation).

In some implementations of the present disclosure, the wireless communications system 100 may support pre-compensation of downlink communication (for example, downlink communication that is compensated for one or more impairments experienced at the UE 115 before or during transmission) based on an impairment report provided to the base station 105 from the UE 115. For example, the UE 115 may transmit, to the base station 105, the impairment report requesting pre-compensation for one or more of the impairments experienced at the UE 115. In some examples, the UE 115 may request pre-compensation for an impairment because the impairment affects the performance of the UE 115 more severely than other impairments. For example, the UE 115 may request pre-compensation for an impairment for which compensation is associated with relatively high processing costs or power consumption, or both, at the UE 115 as compared to other impairments experienced by the UE 115. In some other examples, the UE 115 may request pre-compensation for an impairment because the UE 115 is unable to compensate for the impairment (based on a UE receiver design or capability) or because the base station 105 can compensate for the impairment more effectively (or efficiently) than the UE 115.

The base station 105, based on receiving the impairment report from the UE 115, may determine whether to pre-compensate downlink communication for the requested impairments, or to defer compensation of the requested impairments back to the UE, or a combination thereof. The base station 105 may transmit a feedback message indicating for which of the requested impairments the base station 105 will pre-compensate downlink communication and for which of the requested impairments the base station 105 will refrain from pre-compensating downlink communication to the UE 115, which may provide a mutual understanding between the base station 105 and the UE 115 on which device compensates for which impairments. Such coordination of a compensation scheme between the base station 105 and the UE 115 may result in more efficient utilization of processing power and more effective compensation of impairments as the base station 105 and the UE 115 may assign compensation tasks to the device that is better suited or equipped to perform that compensation.

Figure 2:
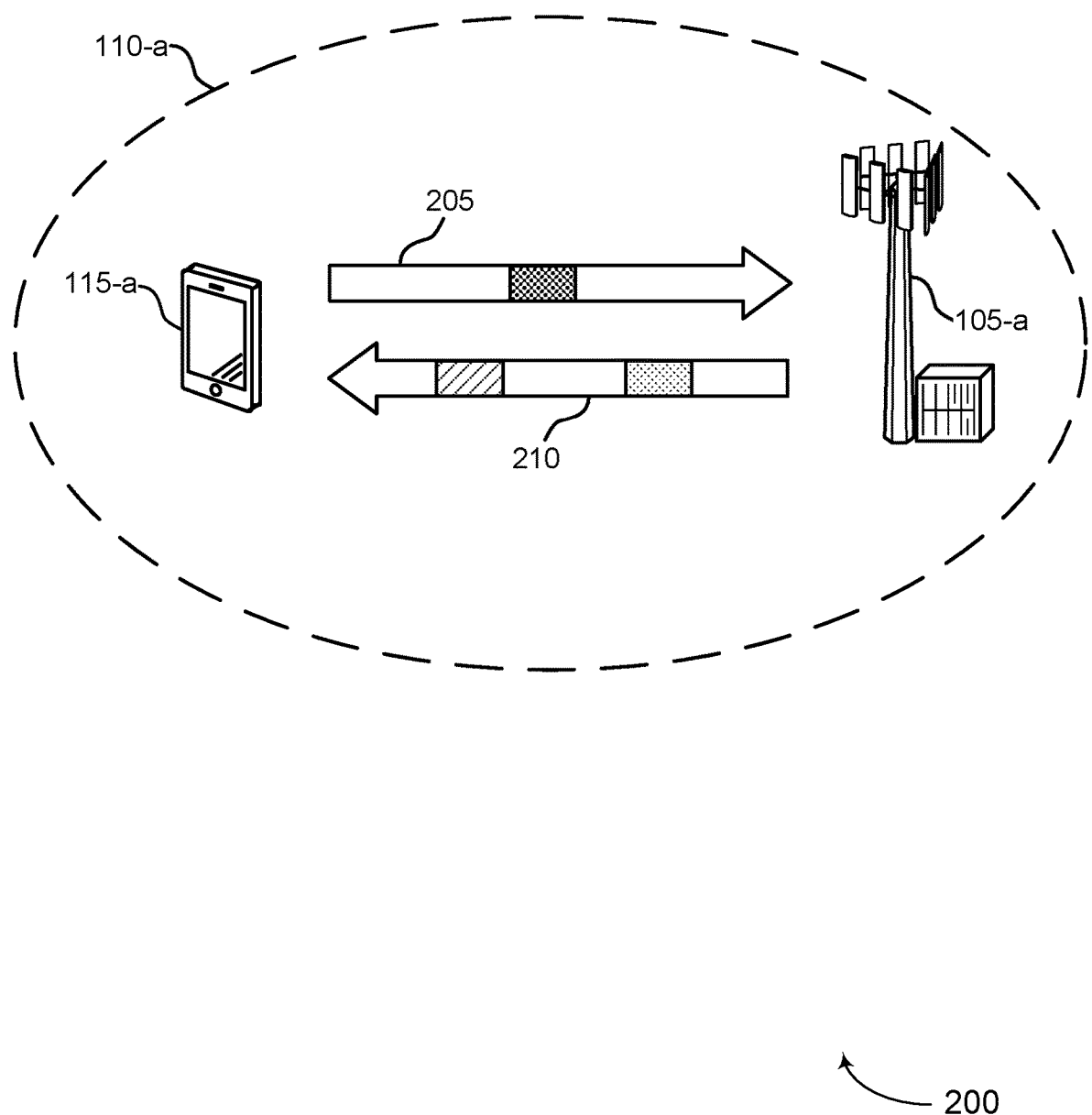
FIG. 2 illustrates an example of a wireless communications system that supports techniques for signaling a source of dominant noise at a UE in accordance with aspects of the present disclosure.

FIG. 2 illustrates an example of a wireless communications system 200 that supports techniques for signaling a source of dominant noise at a UE in accordance with aspects of the present disclosure. The wireless communications system 200 may implement or may be implemented by aspects of the wireless communications system 100. For example, the wireless communications system 200 may include a UE 115-a and a base station 105-a, which may be examples of corresponding devices described herein, including with reference to FIG. 1. In some aspects, the UE 115-a and the base station 105-a may communicate within a geographic coverage area 110-a and may communicate with each other via a communication link 205 (an uplink) and a communication link 210 (a downlink). In some examples, the UE 115-a may transmit an impairment report 215 (a report of dominant noise sources and impairments) to the base station 105-a via the communication link 205 requesting pre-compensation for a select impairment (or multiple select impairments) experienced at the UE 115-a.

For example, the UE 115-a may experience impairments that adversely affect a reliability (or a received signal strength) of downlink communication received from the base station 105-a over the communication link 210. In some aspects, the experienced impairments may limit the performance of the UE 115-a based on reducing the reliability of the downlink communication. For example, the UE 115-a may have a lower likelihood for successfully receiving downlink communication from the base station 105-a that is adversely affected by the impairments experienced at the UE 115-a. In some aspects, such impairments (which may be equivalently referred to as communication factors) may include (or otherwise refer to a detriment caused by) phase noise, a spur, a Doppler shift, a frequency offset, or an IQ mismatch, among other examples.

In some scenarios, for instance, the UE 115-a may experience phase noise that adversely impacts the likelihood for the UE 115-a to successfully receive downlink transmissions 225 from the base station 105-a. In some aspects, phase noise may cause inter-carrier interference (ICI) between subcarriers at the UE 115-a. In some cases, phase noise may be generated due to one or more components at a receiver of the UE 115-a. For example, UE phase noise may include phase noise generated at a local oscillator of the UE 115-a.

In some additional or alternative scenarios, the UE 115-a may experience one or more spurs that adversely impact the likelihood for the UE 115-a to successfully receive downlink transmissions 225 from the base station 105-a. In some aspects, spurs may arise during modulation of data onto a radio frequency (RF) carrier signal and generation of an RF modulated signal. For example, the UE 115-a may modulate data onto an RF carrier signal and generate an RF modulated signal. However, the UE 115-a may also generate an undesired signal in addition to the RF modulated signal, and such an undesired signal may be referred to as a spur. The spur may be generated by one or more of a reference oscillator at a receiver of the UE 115-a, a digital circuit at the receiver of the UE 115-a, or an external source. In some cases, the spur may be generated due to simultaneous operation of multiple technologies at the UE 115-*a*. For example, a spur may occur in examples in which the UE 115-*a* communicates according to a global positioning system (GPS) technology and a 5G technology. For further example, a spur may occur in examples in which the UE 115-*a* communicates according to a second generation (2G) technology and a 5G technology, which may occur in examples in which the UE 115-*a* is in a dual SIM dual active (DSDA) mode. As such, in some cases, the spur generated at the UE 115-*a* may interfere with receivers of other nearby devices (such as other nearby UEs 115). Likewise, spurs generated at the other nearby devices (such as other nearby UEs 115) may cause interference at the UE 115-*a*.

In some additional or alternative scenarios, the UE 115-*a* may experience a Doppler shift that adversely impacts the likelihood for the UE 115-*a* to successfully receive downlink transmissions 225 from the base station 105-*a*. The UE 115-*a* may experience a Doppler shift in examples in which the UE 115-*a* is moving with respect to the base station 105-*a*. As such, if the base station 105-*a* transmits a signal to the UE 115-*a* over a first frequency, the UE 115-*a* may receive the signal with a frequency that is higher or lower than the first frequency over which the base station 105-*a* transmitted the signal. Accordingly, the Doppler shift may cause a frequency offset between the received signal and a local oscillator of the UE 115-*a*. The frequency offset may impair (for example, disrupt or invalidate) orthogonality between subcarriers at the UE 115-*a* and may contribute to ICI. The Doppler shift may also affect interference patterns corresponding to the transmitted signal and may cause the transmitted signal to undergo fading. In other words, the Doppler shift may contribute to received signal degradation at the UE 115-*a*.

In some additional or alternative scenarios, the UE 115-*a* may experience a frequency offset independent of a Doppler shift that adversely impacts the likelihood for the UE 115-*a* to successfully receive downlink transmissions 225 from the base station 105-*a*. For example, a frequency difference may be present between a frequency of a signal transmitted by the base station 105-*a* and a frequency at a local oscillator of the UE 115-*a* that may result in a lower likelihood for successful communication between the base station 105-*a* and the UE 115-*a*, and such a frequency difference may be referred to as a frequency offset. In some cases, the frequency offset may cause ICI between subcarriers at the UE 115-*a*. Additionally or alternatively, the frequency offset may interfere with subcarrier orthogonality and cause bit error rate (BER) degradation at the UE 115-*a*. Further, the frequency offset may cause a cyclic shift of subcarriers at the UE 115-*a*. As such, the frequency offset may cause the UE 115-*a* to incorrectly demodulate downlink transmissions received from the base station 105-*a*.

In some additional or alternative scenarios, the UE 115-*a* may experience an IQ mismatch that adversely impacts the likelihood for the UE 115-*a* to successfully receive downlink transmissions 225 from the base station 105-*a*. In some cases, for example, digital receivers of the UE 115-*a* may employ analog components in the demodulation process of downlink transmissions 225 received from the base station 105-*a*. The analog components of the digital receivers of the UE 115-*a* may suffer from imbalances between the in-phase (I) branches and quadrature-phase (Q) branches, and such imbalances between the I and Q branches may be referred herein to as IQ mismatches. An IQ mismatch may result from a phase noise difference, an amplitude difference, or a temporal difference (for example, a timing skew) between an I path and a Q path in the demodulation process. Further, compensation for an IQ mismatch at the UE 115-*a* may increase power consumption at the UE 115-*a* or may generate additional phase noise, or both.

The UE 115-*a* may compensate for the impairments experienced at the UE 115-*a* based on employing a receiver design that can compensate for the impairments or based on performing one or more processing operations or computations. In some cases, however, such a receiver design or such processing operations or computations may be expensive (in terms of power consumption or processing complexity) and the UE 115-*a* may consume increased power to compensate for the experienced impairments. In some other cases, the UE 115-*a* may employ a simple receiver design and may refrain from compensating for some impairments (for example, the simple receiver design may be an example of a receiver design that prevents the UE 115-*a* from compensating for some impairments). In such cases, the UE 115-*a* may compensate for some impairments but may be unable to compensate for other impairments.

In some examples, both the base station 105-*a* and the UE 115-*a* may be capable of compensating for at least some impairments experienced at the UE 115-*a*. In some scenarios, however, one of the base station 105-*a* or the UE 115-*a* may be more effective or efficient at compensating for an impairment than the other of the base station 105-*a* or the UE 115-*a*. For example, the UE 115-*a* may be capable of compensating for a first set of one or more impairments more effectively or efficiently than the base station 105-*a* and the base station 105-*a* may be capable of compensating for a second set of one or more impairments more effectively or efficiently than the UE 115-*a*. In some cases, however, the base station 105-*a* and the UE 115-*a* may be unable to efficiently or accurately partition or divide compensation tasks between the two devices due to a lack of coordination between the base station 105-*a* and the UE 115-*a*, which may result in inefficient power usage at the base station 105-*a* or the UE 115-*a*, or both.

For example, even though the base station 105-*a* may be capable of pre-compensating for the impairments experienced by the UE 115-*a* (for example, all impairments experienced by the UE 115-*a*), the base station 105-*a* may use increased processing power or use longer timelines to pre-compensate for some of the impairments as compared to a processing power or a timeline over which the UE 115-*a* could have compensated for such impairments. As such, coordination between the base station 105-*a* and the UE 115-*a* on which compensation tasks each device may perform may result in a more efficient partitioning or division of compensation tasks between the two devices in terms of power consumption, processing resources, or timeline.

In some implementations of the present disclosure, the UE 115-*a* may transmit, to the base station 105-*a*, an impairment report 215 requesting pre-compensation (for example, compensation of downlink communication for one or more impairments experienced at the UE 115-*a* before or during transmission of the downlink communication from the base station 105-*a*) for one or multiple of the impairments, such as those experienced at the UE 115-*a*. The UE 115-*a* may include the one or multiple impairments for which pre-compensation is requested in the impairment report 215 based on various factors, including one or more of a relative severity of the requested impairments relative to a remainder of the impairments experienced at the UE 115-*a*, a relative amount of resources for processing the requested impairments relative to a remainder of the impairments experienced at the UE 115-*a*, a timeline associated with compensation for the requested impairments relative to a remainder of the impairments experienced at the UE 115-*a*, or a UE capability, or others.

In some examples, for instance, the UE 115-*a* may request pre-compensation for an impairment because the UE 115-*a* is unable to compensate for the impairment or because pre-compensation of the impairment at the base station 105-*a* would avoid relatively high power-consumption processing operations at the UE 115-*a*. For example, the UE 115-*a* may experience a spur in some communication scenarios with the base station 105-*a* and, without compensation, the spur may reduce the likelihood of a receiver at the UE 115-*a* to successfully decode a downlink transmission 225 from the base station 105-*a*. In some examples, the UE 115-*a* may be unable to or otherwise refrain from compensating for the spur because the UE 115-*a* has a simple receiver design, because the UE 115-*a* is in a low power or battery saving mode, or because the UE 115-*a* is unable to process algorithms for compensating for the spur. As such, the UE 115-*a* may include a request for pre-compensation of the spur in the impairment report 215.

In some aspects, the UE 115-*a* may include information associated with the spur in the impairment report 215. For example, the impairment report 215 may include one or more values associated with a severity or an impact of the spur (based on a measurement of the UE 115-*a*) that may convey how the spur impacts downlink communication between the base station 105-*a* and the UE 115-*a* (such that the base station 105-*a* may appropriately pre-compensate for the spur). In some examples, the base station 105-*a* may pre-compensate a downlink transmission 225 for the spur by refraining from allocating resources for the downlink transmission 225 around the spur. In other words, the base station 105-*a* may allocate, to the UE 115-*a*, a set of resources for the downlink transmission 225 that may not be (or that are less likely to be) impacted by the spur. In such examples in which the base station 105-*a* pre-compensates for the spur requested by the UE 115-*a*, the base station 105-*a* may transmit feedback acknowledging the requested pre-compensation for the spur to the UE 115-*a*. As such, the UE 115-*a* may refrain from performing any processing tasks (for example, computations) to compensate the downlink transmission 225 for the spur based on receiving the acknowledgement feedback for the spur.

In some other examples, the UE 115-*a* may refrain from requesting pre-compensation for an impairment because the UE 115-*a* may compensate for the impairment more effectively or efficiently than the base station 105-*a*. For example, in some communication scenarios with the base station 105-*a*, the UE 115-*a* may experience a frequency offset such that a first frequency of a downlink transmission 225 received from the base station 105-*a* is different than (offset from) a second frequency of a local oscillator at the UE 115-*a*. In such examples, the UE 115-*a* may determine that the UE 115-*a* can compensate for the frequency offset according to a shorter timeline than the base station 105-*a* and, based on the determination, may refrain from requesting pre-compensation for the frequency offset. In some aspects, for example, the UE 115-*a* may determine that the UE 115-*a* can compensate for the frequency offset according to the shorter timeline than the base station 105-*a* based on a severity of the frequency offset (for example, if the severity is relatively low) or based on a type of the impairment being the frequency offset (for example, the UE 115-*a* may compensate for frequency offsets without pre-compensation by the base station 105-*a* as a rule if the UE 115-*a* is capable of compensating for the frequency offset).

For example, the UE 115-*a* may compensate for the frequency offset based on employing one or more algorithms or computations in processing of the downlink transmission 225. On the other hand, for the base station 105-*a* to pre-compensate for the frequency offset, the UE 115-*a* may transmit an uplink reference signal to the base station 105-*a* and the base station 105-*a* may measure the uplink reference signal, estimate the frequency offset based on the measured uplink reference signal, and pre-compensate the downlink transmission 225 according to the estimated frequency offset. Pre-compensation of the frequency offset at the base station 105-*a* may be associated with additional signaling and longer latency relative to compensation for the frequency offset at the UE 115-*a*. As such, pre-compensation for some impairments, such as for a frequency offset, at the UE 115-*a* may be more efficient than pre-compensation for the impairments at the base station 105-*a* and, as such, the UE 115-*a* may refrain from requesting pre-compensation for such impairments in the impairment report 215.

In some implementations, the UE 115-*a* may additionally determine (or qualify its determination of) which impairments to include in the impairment report 215 based on receiving a capability report 220 from the base station 105-*a*. For example, the base station 105-*a* may transmit, to the UE 115-*a*, the capability report 220 indicating a set of impairments for which the base station 105-*a* is capable of compensating downlink communication or for which the base station 105-*a* actively compensates downlink communication to the UE 115-*a*. In some examples, for instance, the capability report 220 may indicate a set of impairments for which the base station 105-*a* is capable of pre-compensating downlink communication to the UE 115-*a*. In such examples, the base station 105-*a* may include, within the capability report 220, the set of impairments for which the base station 105-*a* may pre-compensate downlink communication to the UE 115-*a* based on receiving a request from the UE 115-*a* (for example, via the impairment report 215). In some other examples, the base station 105-*a* may include, within the capability report 220, the set of impairments for which the base station 105-*a* actively (for example, currently or already) pre-compensates downlink communication to the UE 115-*a* without a UE request.

In some aspects, the base station 105-*a* may transmit the capability report 220 to the UE 115-*a* during a connection establishment procedure with the UE 115-*a*. In some examples, the base station 105-*a* may transmit the capability report 220 to the UE 115-*a* in a semi-static manner (for example, as part of a capabilities exchange with the UE 115-*a*) or via dedicated signaling, such as via a dedicated RRC message. Further, the base station 105-*a* may transmit the capability report 220 to the UE 115-*a* before receiving the impairment report 215 from the UE 115-*a* or responsive to (or otherwise after) receiving the impairment report 215 from the UE 115-*a*.

As such, depending on whether the capability report 220 includes a set of impairments for which the base station 105-*a* is capable of pre-compensating downlink communication to the UE 115-*a* or a set of impairments for which the base station 105-*a* actively compensates downlink communication to the UE 115-*a*, the impairment report 215 will include either one or multiple impairments from the set of impairments included in the capability report or one or multiple impairments in addition to the set of impairments included in the capability report, respectively. The base station 105-*a*, based on receiving the impairment report 215 requesting pre-compensation for some impairments, may determine whether to pre-compensate for the requested impairments or to defer compensation of the requested impairments to the UE 115-*a*. For example, the base station 105-*a* may determine whether to pre-compensate for a requested impairment or to defer compensation of the requested impairment to the UE 115-*a* based on one or more of a severity of the requested impairment, a type of the requested impairment (such as a phase noise, a spur, a Doppler shift, a frequency offset, or an IQ mismatch), which of the base station 105-*a* or the UE 115-*a* may compensate for the requested impairment according to a shorter timeline, which of the base station 105-*a* or the UE 115-*a* may compensate for the requested impairment more effectively, or which of the base station 105-*a* or the UE 115-*a* may compensate for the requested impairment more efficiently (in terms of processing power or power consumption. In some implementations, the base station 105-*a* may transmit a feedback message indicating the determinations of the base station 105-*a* with respect to whether or not to pre-compensate for the requested impairments.

As such, the feedback message may include, for at least one if not each requested impairment, either an indication of an acknowledgement for that requested impairment or an indication of a deferral for that requested impairment. The UE 115-*a* may likewise receive the feedback message from the base station 105-*a* and determine for which (if any) of the requested impairments the base station 105-*a* will pre-compensate a downlink transmission 225 and for which (if any) of the requested impairments the UE 115-*a* will compensate the downlink transmission 225. In examples in which the base station 105-*a* acknowledges pre-compensation for a requested impairment, the base station 105-*a* may trigger one or more processing mechanisms for compensating for the requested impairment (which may be a most important or critical limiting impairment in terms of power consumption or reliability).

The base station 105-*a* may transmit the downlink transmission 225 (for example, a pre-compensated downlink transmission 225) based on for which of the requested impairments the base station 105-*a* acknowledges and for which (if any) impairments the base station 105-*a* actively pre-compensates (without a UE request). Accordingly, the UE 115-*a* may receive the downlink transmission 225 and process the downlink transmission 225 to compensate for any of the requested impairments that are deferred by the base station 105-*a* and for any non-requested impairments measured or otherwise determined by the UE 115-*a*. The base station 105-*a* may pre-compensate the downlink transmission 225 for various impairments, including for impairments related to phase noise, a spur, a Doppler shift, a frequency offset, or an IQ mismatch, among other examples.

In examples in which the base station 105-*a* acknowledges pre-compensation for phase noise experienced at the UE 115-*a*, the base station 105-*a* may pre-compensate for the phase noise based on tracking and estimating a common phase error (CPE) associated with a UE phase noise component of an uplink signal received from the UE 115-*a*. Additionally or alternatively, the base station 105-*a* may estimate the experienced phase noise based on tracking a phase of a local oscillator of the UE 115-*a*. As such, the base station 105-*a* may pre-compensate the downlink transmission 225 based on the estimated UE phase noise component or the estimated phase noise based on the local oscillator of the UE 115-*a*.

Additionally or alternatively, in examples in which the base station 105-*a* acknowledges pre-compensation for a spur experienced at the UE 115-*a*, the base station 105-*a* may pre-compensate the downlink transmission 225 for the spur based on refraining from allocating resources around (for example, near or within a threshold separation in frequency) the spur. In other words, the base station 105-*a* may allocate a set of resources that are not (or that are not likely to be) impacted by the spur. The base station 105-*a* may indicate the set of resources to the UE 115-*a* via signaling (such as downlink control signaling) and may transmit the downlink transmission 225 to the UE 115-*a* over the set of resources.

Additionally or alternatively, in examples in which the base station 105-*a* acknowledges pre-compensation for a Doppler shift experienced at the UE 115-*a*, the base station 105-*a* may implement a frequency compensation scheme to pre-compensate the downlink transmission 225 for the Doppler shift. In some aspects, the compensation scheme may include an adaptive algorithm that adjusts a modulation scheme according to the Doppler shift. For example, the base station 105-*a* may switch from a first modulation scheme with a higher coding rate (such as a quadrature amplitude modulation (QAM) scheme, for example, a 64-QAM) to a second modulation scheme with a lower coding rate (such as a binary phase-shift keying (BPSK) modulation scheme). The second modulation scheme may be associated with higher reliability and lower data rates.

Additionally or alternatively, in examples in which the base station 105-*a* acknowledges pre-compensation for a frequency offset experienced at the UE 115-*a*, the base station 105-*a* may use an algorithm to estimate a value for the frequency offset based on an uplink reference signal received from the UE 115-*a*. As such, the base station 105-*a* may pre-compensate the downlink transmission 225 based on the estimated value for the frequency offset. In some aspects, such pre-compensation may be referred to as a frequency compensation scheme. Additionally or alternatively, in examples in which the base station 105-*a* acknowledges pre-compensation for an IQ mismatch experienced by the UE 115-*a*, the base station 105-*a* may use an algorithm to process an uplink reference signal received from the UE 115-*a*. Based on processing the uplink reference signal, the base station 105-*a* may estimate a value for the IQ mismatch. The base station 105-*a* may pre-compensate the downlink transmission 225 according to the estimated value for the IQ mismatch.

In some examples, the base station 105-*a* and the UE 115-*a* may transmit the capability report 220 and the impairment report 215, respectively, during an initial access or synchronization procedure, such as a connection establishment procedure, and, in some implementations, the UE 115-*a* may continue to monitor the impairments experienced at the UE 115-*a* after connection establishment. For example, the UE 115-*a* may continuously (or periodically) measure the downlink channel between the base station 105-*a* and the UE 115-*a* to maintain knowledge of which impairments are experienced at the UE 115-*a* and which impairments are most sever or consume a greater amount of power or processing resources of the UE 115-*a* relative to other impairments experienced at the UE 115-*a*. As such, the UE 115-*a* may detect any emerging (or worsening) impairments or noise sources and the UE 115-*a* may determine if any of the emerging impairments (or any other non-reported impairments) satisfy a criteria for requesting pre-compensation if any of the emerging impairments become more sever or consume a greater amount of processing resources than one or more other impairments, such as a remainder of the impairments, experienced at the UE 115-*a*. For example, if an emerging impairment becomes a dominant noise source at the UE 115-*a*, the UE 115-*a* may determine to request pre-compensation for the emerging impairment by the base station 105-a. Such an emerging impairment may be equivalently referred to or understood as an "ad hoc" impairment, and the UE 115-a may include an indication of the emerging impairment in a second impairment report 215 that the UE 115-a may transmit to the base station 105-a.

The UE 115-a may transmit the second impairment report 215 according to various reporting options, including periodically, aperiodically, semi-persistently, or semi-statically. For example, the UE 115-a may receive a configured set of periodic or semi-persistent resources over which the UE 115-a may transmit impairment reports 215 (which may provide regular feedback to the base station 105-a as to which impairments are most severe or most limiting to the UE 115-a). Additionally or alternatively, the UE 115-a may be configured with a threshold (such as a threshold severity, a threshold amount of processing resources, or a threshold power consumption) and, if the UE 115-a determines that any of the impairments experienced at the UE 115-a satisfy or exceed the threshold, the UE 115-a may transmit an instance of the impairment report 215 requesting pre-compensation for the impairments that satisfy or exceed the threshold. Additionally or alternatively, the UE 115-a may transmit an instance of the impairment report 215 based on receiving a triggering message from the base station 105-a. The UE 115-a may transmit an impairment report 215 (either the initial impairment report 215 transmitted during connection establishment or a second impairment report 215 transmitted after connection establishment) via a MAC control element (MAC-CE) or an RRC message, such as an RRC triggered message.

The base station 105-a, upon receiving the second impairment report 215, may acknowledge pre-compensation or defer compensation to the UE 115-a for the newly requested impairments and may transmit a second feedback message to the UE 115-a indicating for which of (if any) the newly requested impairments the base station 105-a will pre-compensate a second downlink transmission 225 and for which of (if any) the newly requested impairments the base station 105-a defers compensation to the UE 115-a. In some examples, the base station 105-a may pre-compensate the second downlink transmission 225 for both the previously acknowledged impairments and for any newly acknowledged impairments. In some other examples, the base station 105-a may pre-compensate the second downlink transmission 225 for the newly acknowledged impairments and may refrain from pre-compensating the second downlink transmission 225 for the previously acknowledged impairments (for example, the base station 105-a may terminate pre-compensation for previously acknowledged impairments based on receiving the second impairment report 215 or based on transmitting the second feedback message).

As such, the base station 105-a and the UE 115-a may establish a mutual understanding of a division of compensation tasks between the base station 105-a and the UE 115-a for impairments experienced at the UE 115-a based on various factors, including a severity of the impairments experienced at the UE 115-a, an amount of resources usable for processing the impairments experienced at the UE 115-a relative to an amount of resources usable at the base station 105-a, a timeline associated with compensation of the impairments experienced at the UE 115-a relative to a timeline at the base station 105-a, or a UE capability, during a connection establishment procedure. The base station 105-a and the UE 115-a, via the signaling of additional impairment reports 215 after connection establishment, may maintain such mutual understanding and adjust or otherwise revise the division of partitioning tasks between the base station 105-a and the UE 115-a based on any emerging impairments, changing channel conditions, or changes in UE configuration. Accordingly, the base station 105-a and the UE 115-a may increase the reliability of communication between the base station 105-a and the UE 115-a while efficiently using the processing power and capabilities of both the base station 105-a and the UE 115-a.

Figure 3:
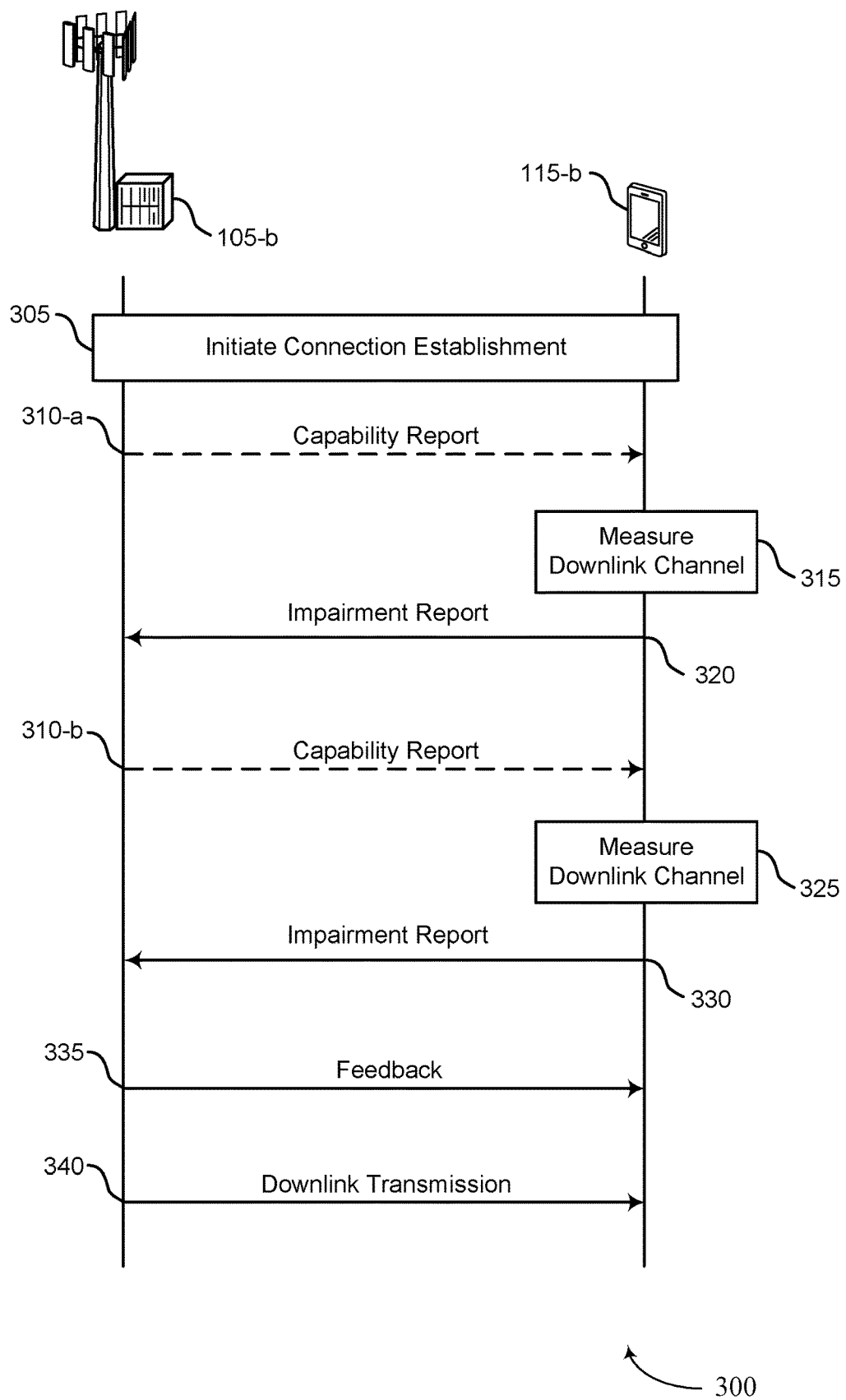
FIG. 3 illustrates an example of a process flow that supports techniques for signaling a source of dominant noise at a UE in accordance with aspects of the present disclosure.

FIG. 3 illustrates an example of a process flow 300 that supports techniques for signaling a source of dominant noise at a UE in accordance with aspects of the present disclosure. The process flow 300 may be implemented by or may implement aspects of the wireless communications system 100 or the wireless communications system 200. For example, the process flow 300 illustrates communication between a UE 115-b and a base station 105-b, which may be examples of corresponding devices described herein, including with reference to FIGS. 1 and 2.

At 305, the base station 105-b or the UE 115-b, or both, may initiate a connection establishment procedure. In some examples, the connection establishment procedure may include a capabilities exchange between the base station 105-b and the UE 115-b. In some aspects, the connection establishment procedure may be an example of an initial access procedure or a synchronization procedure.

At 310-a, the base station 105-b may, in some implementations, transmit a capability report to the UE 115-b indicating one or more first communication factors for which the base station 105-b is capable of compensating downlink communication to the UE 115-b. In some examples, the one or more first communication factors may be examples of a list of impairments for which the base station 105-b may be capable of pre-compensating downlink communication to the UE 115-b upon a UE request. Alternatively, the one or more first communication factors may be examples of a list of impairments for which the base station 105-b actively pre-compensates downlink communication to the UE 115-b (for example, without a UE request). In some aspects, the base station 105-b may transmit the capability report to the UE 115-b during the connection establishment procedure.

At 315, the UE 115-b may measure the downlink channel between the base station 105-b and the UE 115-b for information associated with a set of communication factors. For example, the UE 115-b may determine, via a measurement of the downlink channel or based on a configuration of the UE 115-b, which impairments are adversely affecting signaling between the base station 105-b and the UE 115-b and may determine which of the impairments experienced at the UE 115-b are relatively most severe or associated with a relatively greatest amount of resources for processing. For example, the UE 115-b may identity a one, two, or three most severe impairments experienced by the UE 115-b relative to a remainder of the impairments experienced at the UE 115-b. In some aspects, the set of communication factors (or impairments) may include one or more of a phase noise impairment, an IQ mismatch impairment, a Doppler shift impairment, a frequency offset impairment, or a spur impairment.

At 320, the UE 115-b may transmit, to the base station 105-b via an impairment report, an indication of one or more second communication factors from the set of communication factors based at least in part on the information associated with the set of communication factors. In some examples, such as in examples in which the capability report indicates for which communication factors (or impairments) the base station 105-b is capable of pre-compensating, the one or more second communication factors may be at least a subset of the one or more first communication factors. In some other examples, such as in examples in which the capability report indicates for which communication factors (or impairments) the base station 105-b is actively pre-compensating, the one or more second communication factors may be different than the one or more first communication factors.

The UE 115-b may select to include the one or more second communication factors in the impairment report based on determining that the one or more second communication factors have a greater severity relative to a remainder of the set of communication factors determined at the UE 115-b. For example, the UE 115-b may select the one or more second communication factors based on determining the communication factors or impairments having the largest impact on downlink communication to the UE 115-b. Additionally or alternatively, the UE 115-b may select to include the one or more second communication factors in the impairment report based on determining that the one or more second communication factors are estimated to use a greater amount of resources for processing relative to a remainder of the set of communication factors. For example, the UE 115-b may select the one or more second communication factors based on determining the communication factors or impairments having the largest impact on a processing ability of the UE 115-b. In some aspects, the UE 115-b may transmit the impairment report including the indication of the one or more second communication factors during the connection establishment procedure. In some examples, the UE 115-b may transmit the impairment report in a semi-static manner as part of the capabilities exchange of the connection establishment procedure or via a dedicated RRC message.

At 310-b, may, in some implementations, transmit the capability report to the UE 115-b indicating one or more first communication factors for which the base station 105-b is capable of compensating downlink communication to the UE 115-b. In some examples, the one or more first communication factors may be examples of a list of impairments for which the base station 105-b may be capable of pre-compensating downlink communication to the UE 115-b upon a UE request. Alternatively, the one or more first communication factors may be examples of a list of impairments for which the base station 105-b actively pre-compensates downlink communication to the UE 115-b (for example, without a UE request). In some aspects, the base station 105-b may transmit the capability report to the UE 115-b during the connection establishment procedure.

In some aspects, the base station 105-b may transmit the capability report to the UE 115-b at 310-b if the base station 105-b refrained from transmitting the capability report at 310-a. Likewise, if the base station 105-b transmitted the capability report to the UE 115-b at 310-a, the base station 105-b may refrain from transmitting the capability report at 310-b. Alternatively, the base station 105-b may transmit the capability report at 310-a and at 310-b. In examples in which the base station 105-b transmits the capability report at 310-b, the capability report may function as feedback indicating for which of the requested impairments the base station 105-b pre-compensates downlink communication to the UE 115-b for mutual understanding or awareness of the pre-compensation employed at the base station 105-b.

At 325, the UE 115-b may measure the downlink channel between the base station 105-b and the UE 115-b for updated information associated with the set of communication factors. For example, the UE 115-b may continue to monitor or attempt to detect any emerging impairments or noise sources after connection establishment with the base station 105-b. As such, the UE 115-b may determine if any emerging impairments or noise sources satisfy a criteria or condition for reporting to the base station 105-b.

At 330, the UE 115-b may transmit, to the base station 105-b, a second indication of one or more third communication factors from the set of communication factors based on the updated information associated with the set of communication factors or based on a configuration of the UE 115-b, or both. In some examples, the one or more third communication factors may be examples of any newly reported impairments that the UE 115-b determines to have a sufficiently great severity or use a sufficiently large amount of processing resources at the UE 115-b. In some aspects, the UE 115-b may transmit the impairment report including the indication of the one or more third communication factors after the initial access procedure, and such one or more third communication factors may be referred to herein as "ad hoc" impairments. In some examples, the UE 115-b may transmit the impairment report including the indication of the one or more third communication factors via a MAC-CE or via an RRC triggered message (in examples in which the UE 115-b receives a message from the base station 105-b requesting or otherwise triggering transmission of the impairment report).

At 335, the base station 105-b may transmit, to the UE 115-b, a feedback message indicating a confirmation of compensation by the base station 105-b for each of the one or more second communication factors or a deferment of compensation for each of the one or more second communication factors. In some examples, the feedback message may be a downlink control information (DCI) message, a MAC-CE, or an RRC message (such as an RRC triggered message). Additionally or alternatively, the base station 105-b may also transmit, to the UE 115-b, a second feedback message indicating a confirmation of compensation by the base station 105-b for each of the one or more third communication factors or a deferment of compensation for each of the one or more third communication factors.

At 340, the base station 105-b may transmit, to the UE 115-b, a downlink transmission that is pre-compensated for at least one of the one or more second communication factors. For example, the base station 105-b may pre-compensate the downlink transmission for any requested and acknowledged impairments based on modifying the downlink transmission before or during transmission such that the UE 115-b receives the downlink transmission correctly without having to compensate for the impairment at a receiver or processor of the UE 115-b. In other words, the pre-compensated downlink transmission may become correct over-the-air or at a receiver of the UE 115-b based on the influence or impact of the impairment.

Figure 4:
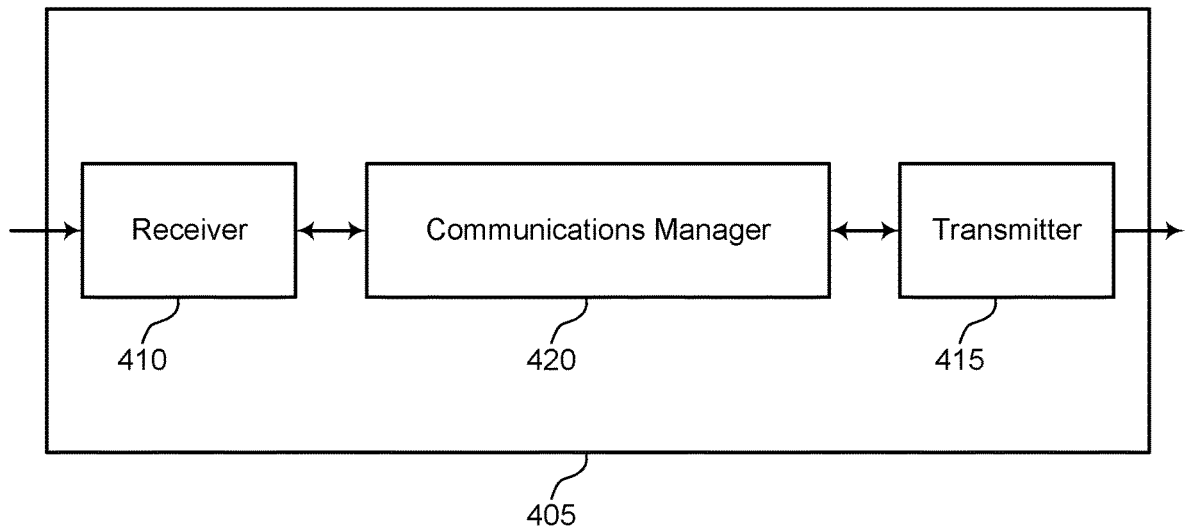
FIGS. 4 and 5 show block diagrams of devices that support techniques for signaling a source of dominant noise at a UE in accordance with aspects of the present disclosure.

FIG. 4 shows a block diagram of a device 405 that supports techniques for signaling a source of dominant noise at a UE in accordance with aspects of the present disclosure. The device 405 may be an example of aspects of a UE 115. The device 405 may include a receiver 410, a transmitter 415, and a communications manager 420. The communications manager 420 can be implemented, at least in part, by one or both of a modem and a processor. Each of these components may be in communication with one another (for example, via one or more buses).

The receiver 410 may provide a means for receiving information such as packets, user data, control information, or any combination thereof associated with various information channels (for example, control channels, data channels, information channels related to techniques for signaling a source of dominant noise at a UE). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (for example, control channels, data channels, information channels related to techniques for signaling a source of dominant noise at a UE). In some examples, the transmitter 415 may be co-located with a receiver 410 in a transceiver component. The transmitter 415 may utilize a single antenna or a set of multiple antennas.

The communications manager 420, the receiver 410, the transmitter 415, or various combinations thereof or various components thereof may be examples of means for performing various aspects of techniques for signaling a source of dominant noise at a UE 115. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (for example, in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally or alternatively, in some examples, the communications manager 420, the receiver 410, the transmitter 415, or various combinations or components thereof may be implemented in code (for example, as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (for example, configured as or otherwise supporting a means for performing the functions described in the present disclosure).

In some examples, the communications manager 420 may be configured to perform various operations (for example, receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations.

The communications manager 420 may support wireless communication at a UE in accordance with examples as disclosed herein. For example, the communications manager 420 may be configured as or otherwise support a means for initiating a connection establishment procedure with a base station. The communications manager 420 may be configured as or otherwise support a means for receiving, from the base station, a capability report indicating one or more first communication factors for which the base station is capable of compensating downlink communication. The communications manager 420 may be configured as or otherwise support a means for measuring a downlink channel between the base station and the UE for information associated with a set of communication factors. The communications manager 420 may be configured as or otherwise support a means for transmitting, to the base station, an indication of one or more second communication factors from the set of communication factors based on the information associated with the set of communication factors.

In some examples, the communications manager 420 may be implemented as an integrated circuit or chipset for a mobile device modem, and the receiver 410 and the transmitter 415 may be implemented as analog components (such as amplifiers, filters, and antennas) coupled to the mobile device modem to enable wireless transmission and reception over one or more bands.

By including or configuring the communications manager 420 in accordance with the implementations of the present disclosure, the device 405 (for example, a processor controlling or otherwise coupled to one or more of the receiver 410, the transmitter 415, or the communications manager 420) may support techniques for reduced processing, reduced power consumption, more efficient utilization of communication resources.

For example, the communications manager 420, based on implementing the techniques described herein, may receive a pre-compensated downlink transmission such that the communications manager 420, or one or more processing components of the communications manager 420, may refrain from compensating for the pre-compensated impairment. As such, the communications manager 420 may perform fewer processing operations or computations and may enter a sleep mode for longer durations or more frequently, which may result in improved power savings and increased battery life of the device 405.

Figure 5:
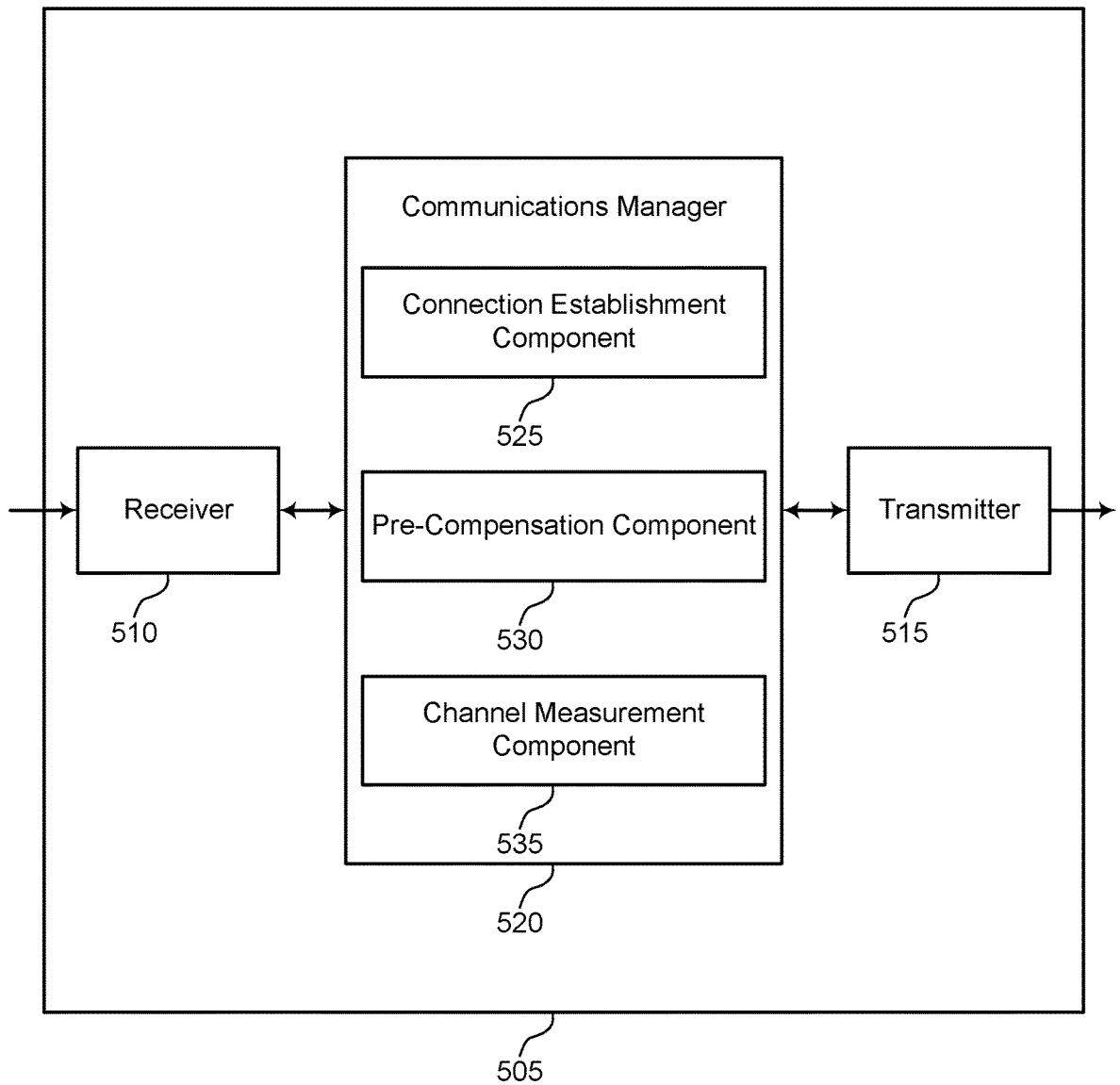

FIG. 5 shows a block diagram of a device 505 that supports techniques for signaling a source of dominant noise at a UE in accordance with aspects of the present disclosure. The device 505 may be an example of aspects of a device 405 or a UE 115. The device 505 may include a receiver 510, a transmitter 515, and a communications manager 520. The communications manager 520 can be implemented, at least in part, by one or both of a modem and a processor. Each of these components may be in communication with one another (for example, via one or more buses).

The receiver 510 may provide a means for receiving information such as packets, user data, control information, or any combination thereof associated with various information channels (for example, control channels, data channels, information channels related to techniques for signaling a source of dominant noise at a UE). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (for example, control channels, data channels, information channels related to techniques for signaling a source of dominant noise at a UE). In some examples, the transmitter 515 may be co-located with a receiver 510 in a transceiver component. The transmitter 515 may utilize a single antenna or a set of multiple antennas.

The device 505, or various components thereof, may be an example of means for performing various aspects of techniques for signaling a source of dominant noise at a UE 115. For example, the communications manager 520 may include a connection establishment component 525, a pre-compensation component 530, a channel measurement component 535, or any combination thereof. In some examples, the communications manager 520, or various components thereof, may be configured to perform various operations (for example, receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations.

The communications manager 520 may support wireless communication at a UE in accordance with examples as disclosed herein. The connection establishment component 525 may be configured as or otherwise support a means for initiating a connection establishment procedure with a base station. The pre-compensation component 530 may be configured as or otherwise support a means for receiving, from the base station, a capability report indicating one or more first communication factors for which the base station is capable of compensating downlink communication. The channel measurement component 535 may be configured as or otherwise support a means for measuring a downlink channel between the base station and the UE for information associated with a set of communication factors. The pre-compensation component 530 may be configured as or otherwise support a means for transmitting, to the base station, an indication of one or more second communication factors from the set of communication factors based on the information associated with the set of communication factors.

Figure 6:
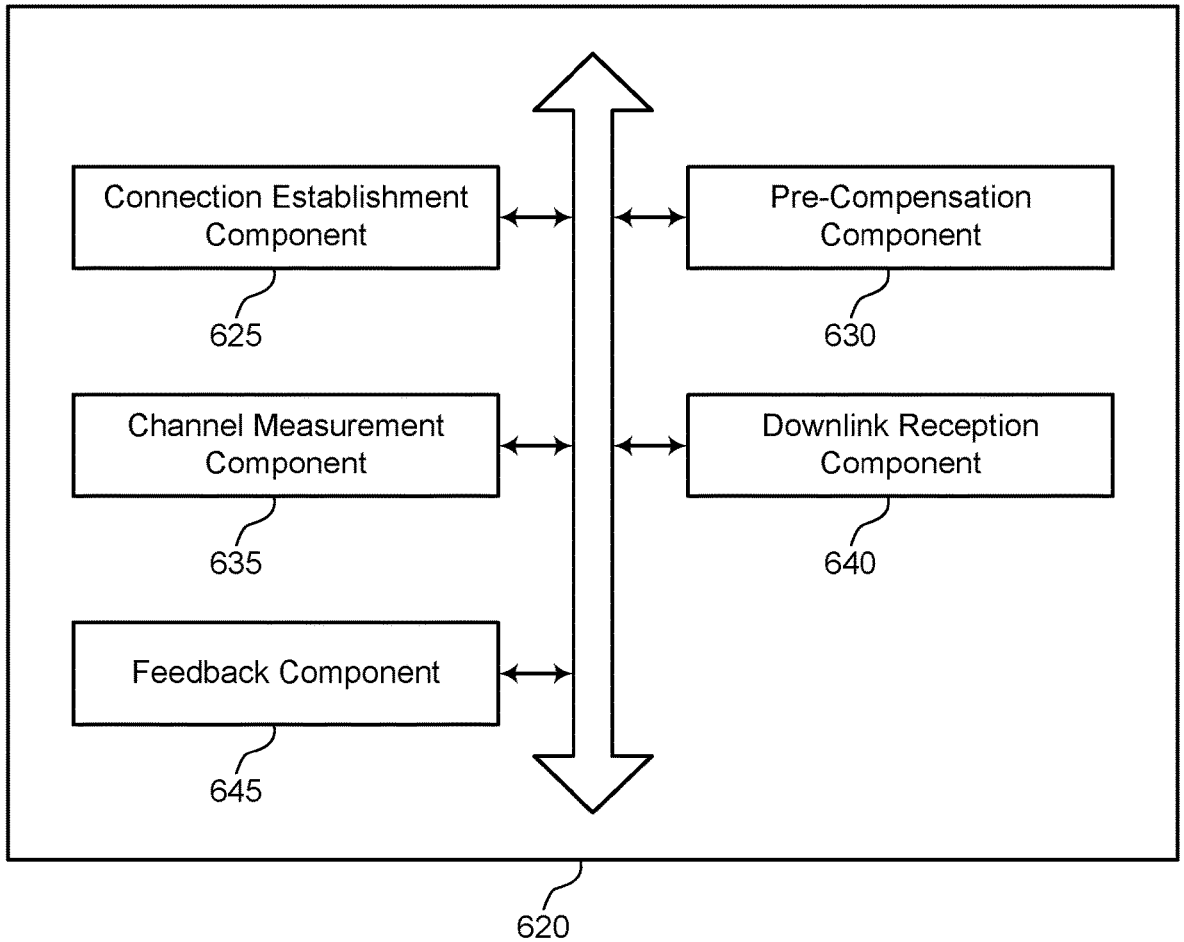
FIG. 6 shows a block diagram of a communications manager that supports techniques for signaling a source of dominant noise at a UE in accordance with aspects of the present disclosure.

FIG. 6 shows a block diagram of a communications manager 620 that supports techniques for signaling a source of dominant noise at a UE in accordance with aspects of the present disclosure. The communications manager 620, or various components thereof, may be an example of means for performing various aspects of techniques for signaling a source of dominant noise at a UE 115. For example, the communications manager 620 may include a connection establishment component 625, a pre-compensation component 630, a channel measurement component 635, a downlink reception component 640, a feedback component 645, or any combination thereof. Each of these components may communicate, directly or indirectly, with one another (for example, via one or more buses).

The communications manager 620 may support wireless communication at a UE in accordance with examples as disclosed herein. The connection establishment component 625 may be configured as or otherwise support a means for initiating a connection establishment procedure with a base station. The pre-compensation component 630 may be configured as or otherwise support a means for receiving, from the base station, a capability report indicating one or more first communication factors for which the base station is capable of compensating downlink communication. The channel measurement component 635 may be configured as or otherwise support a means for measuring a downlink channel between the base station and the UE for information associated with a set of communication factors. In some examples, the pre-compensation component 630 may be configured as or otherwise support a means for transmitting, to the base station, an indication of one or more second communication factors from the set of communication factors based on the information associated with the set of communication factors.

In some examples, the downlink reception component 640 may be configured as or otherwise support a means for receiving, from the base station, a downlink transmission that is compensated for at least one of the one or more second communication factors, and the one or more second communication factors may include a subset of the one or more first communication factors. In some examples, the capability report indicates that the base station compensates the downlink communication for the one or more first communication factors, and the downlink reception component 640 may be configured as or otherwise support a means for receiving, from the base station, a downlink transmission that is compensated for the one or more first communication factors and for at least one of the one or more second communication factors, and the one or more second communication factors may be different than the one or more first communication factors.

In some examples, to support transmitting the indication of the one or more second communication factors, the pre-compensation component 630 may be configured as or otherwise support a means for transmitting the indication of the one or more second communication factors based on a severity of each of the set of communication factors, and the severity of each of the set of communication factors is based on measuring the downlink channel for the information associated with the set of communication factors. In some examples, the one or more second communication factors have a greater severity relative to a remainder of the set of communication factors.

In some examples, to support transmitting the indication of the one or more second communication factors, the pre-compensation component 630 may be configured as or otherwise support a means for transmitting the indication of the one or more second communication factors based on estimating an amount of resources to be used to process each of the set of communication factors. In some examples, the one or more second communication factors are estimated to use a greater amount of resources for processing relative to a remainder of the set of communication factors.

In some examples, the channel measurement component 635 may be configured as or otherwise support a means for measuring the downlink channel between the base station and the UE for updated information associated with the set of communication factors. In some examples, the pre-compensation component 630 may be configured as or otherwise support a means for transmitting, to the base station, a second indication of one or more third communication factors from the set of communication factors based on the updated information associated with the set of communication factors and based on a configuration of the UE.

In some examples, the feedback component 645 may be configured as or otherwise support a means for receiving, from the base station, a feedback message indicating a confirmation of compensation by the base station for each of the one or more second communication factors or a deferment of compensation for each of the one or more second communication factors.

In some examples, the downlink reception component 640 may be configured as or otherwise support a means for receiving, from the base station, a message requesting the indication of the one or more second communication factors. In some examples, transmitting the indication of the one or more second communication factors is based on receiving the message. In some examples, the set of communication factors includes one or more of a phase noise impairment, an in-phase and quadrature-phase mismatch impairment, a Doppler shift impairment, a frequency offset impairment, or a spur impairment.

Figure 7:
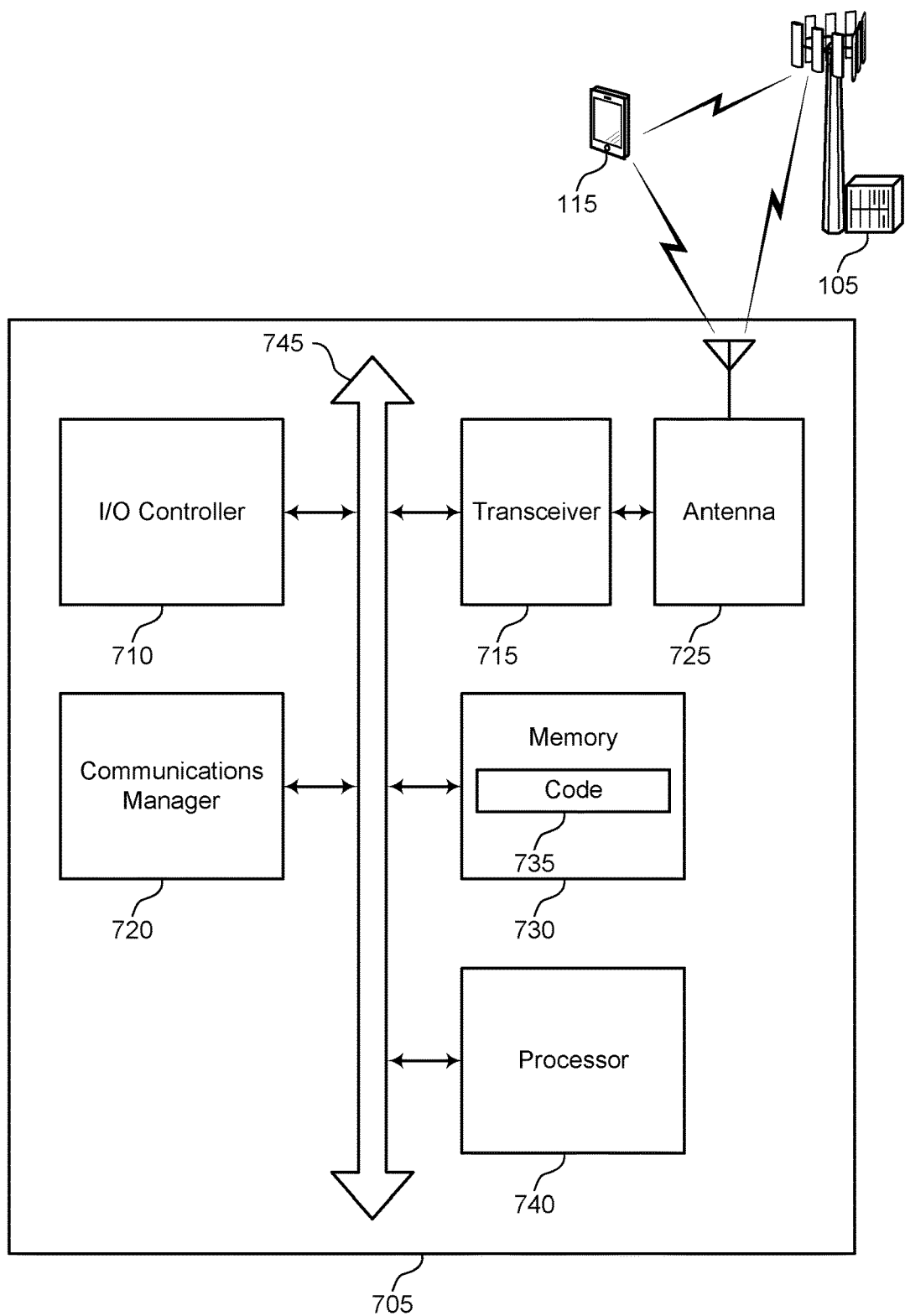
FIG. 7 shows a diagram of a system including a device that supports techniques for signaling a source of dominant noise at a UE in accordance with aspects of the present disclosure.

FIG. 7 shows a diagram of a system including a device 705 that supports techniques for signaling a source of dominant noise at a UE in accordance with aspects of the present disclosure. The device 705 may be an example of or include the components of a device 405, a device 505, or a UE 115. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (for example, operatively, communicatively, functionally, electronically, electrically) via one or more buses (for example, a bus 745).

The I/O controller 710 may manage input and output signals for the device 705. The I/O controller 710 may also manage peripherals not integrated into the device 705. In some examples, the I/O controller 710 may represent a physical connection or port to an external peripheral. In some examples, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some examples, the I/O controller 710 may be implemented as part of a processor, such as the processor 740. In some examples, a user may interact with the device 705 via the I/O controller 710 or via hardware components controlled by the I/O controller 710.

In some examples, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof.

The memory 730 may include random access memory (RAM) and read-only memory (ROM). The memory 730 may store computer-readable, computer-executable code 735 including instructions that, if executed by the processor 740, cause the device 705 to perform various functions described herein. The code 735 may be stored in a non-transitory computer-readable medium such as system memory or another type of memory. In some examples, the code 735 may not be directly executable by the processor 740 but may cause a computer (for example, if compiled and executed) to perform functions described herein. In some examples, the memory 730 may contain, among other things, a basic I/O system (BIOS) which may control basic hardware or software operation such as the interaction with peripheral components or devices.

The processor 740 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 740 may be configured to operate a memory array using a memory controller. In some other cases, a memory controller may be integrated into the processor 740. The processor 740 may be configured to execute computer-readable instructions stored in a memory (for example, the memory 730) to cause the device 705 to perform various functions (for example, functions or tasks supporting techniques for signaling a source of dominant noise at a UE). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for initiating a connection establishment procedure with a base station. The communications manager 720 may be configured as or otherwise support a means for receiving, from the base station, a capability report indicating one or more first communication factors for which the base station is capable of compensating downlink communication. The communications manager 720 may be configured as or otherwise support a means for measuring a downlink channel between the base station and the UE for information associated with a set of communication factors. The communications manager 720 may be configured as or otherwise support a means for transmitting, to the base station, an indication of one or more second communication factors from the set of communication factors based on the information associated with the set of communication factors.

By including or configuring the communications manager 720 in accordance with implementations of the present disclosure, the device 705 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 720 may be configured to perform various operations (for example, receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for signaling a source of dominant noise at a UE 115, or the processor 740 and the memory 730 may be otherwise configured to perform or support such operations.

Figure 8:
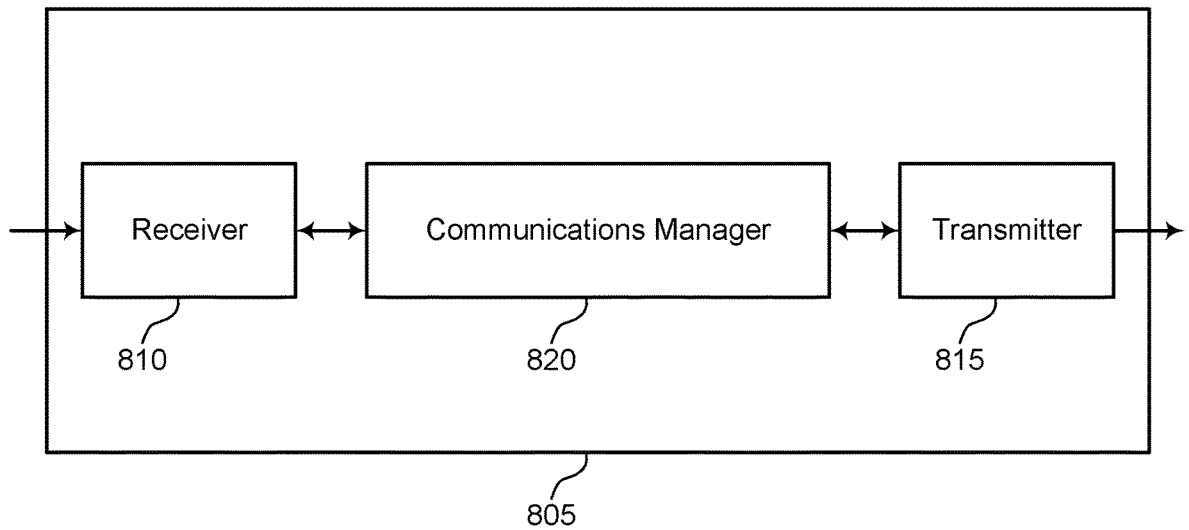
FIGS. 8 and 9 show block diagrams of devices that support techniques for signaling a source of dominant noise at a UE in accordance with aspects of the present disclosure.

FIG. 8 shows a block diagram of a device 805 that supports techniques for signaling a source of dominant noise at a UE in accordance with aspects of the present disclosure. The device 805 may be an example of aspects of a base station 105. The device 805 may include a receiver 810, a transmitter 815, and a communications manager 820. The communications manager 820 can be implemented, at least in part, by one or both of a modem and a processor. Each of these components may be in communication with one another (for example, via one or more buses).

The receiver 810 may provide a means for receiving information such as packets, user data, control information, or any combination thereof associated with various information channels (for example, control channels, data channels, information channels related to techniques for signaling a source of dominant noise at a UE). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (for example, control channels, data channels, information channels related to techniques for signaling a source of dominant noise at a UE). In some examples, the transmitter 815 may be co-located with a receiver 810 in a transceiver component. The transmitter 815 may utilize a single antenna or a set of multiple antennas.

The communications manager 820, the receiver 810, the transmitter 815, or various combinations thereof or various components thereof may be examples of means for performing various aspects of techniques for signaling a source of dominant noise at a UE 115. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (for example, in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally or alternatively, in some examples, the communications manager 820, the receiver 810, the transmitter 815, or various combinations or components thereof may be implemented in code (for example, as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (for example, configured as or otherwise supporting a means for performing the functions described in the present disclosure).

In some examples, the communications manager 820 may be configured to perform various operations (for example, receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations.

The communications manager 820 may support wireless communication at a base station in accordance with examples as disclosed herein. For example, the communications manager 820 may be configured as or otherwise support a means for initiating a connection establishment procedure with a UE. The communications manager 820 may be configured as or otherwise support a means for transmitting, to the UE, a capability report indicating one or more first communication factors for which the base station is capable of compensating downlink communication to the UE. The communications manager 820 may be configured as or otherwise support a means for receiving, from the UE, an indication of one or more second communication factors from a set of communication factors based on a downlink channel between the base station and the UE. The communications manager 820 may be configured as or otherwise support a means for transmitting, to the UE, a downlink transmission that is compensated for at least one of the one or more second communication factors.

By including or configuring the communications manager 820 in accordance with implementations of the present disclosure, the device 805 (for example, a processor controlling or otherwise coupled to one or more of the receiver 810, the transmitter 815, or the communications manager 820) may support techniques for reduced processing, reduced power consumption, and more efficient utilization of communication or processing resources.

For example, based on implementing the described techniques, the communications manager 820 may pre-compensate for one or multiple impairments experienced at a UE 115, which may increase the likelihood for successful communication between the device 805 and the UE 115. Further, the communications manager 820 may coordinate with the UE 115 on which device may compensate for which impairments, which may provide for more efficient distribution of processing tasks and power usage at both the device 805 and the UE 115.

Figure 9:
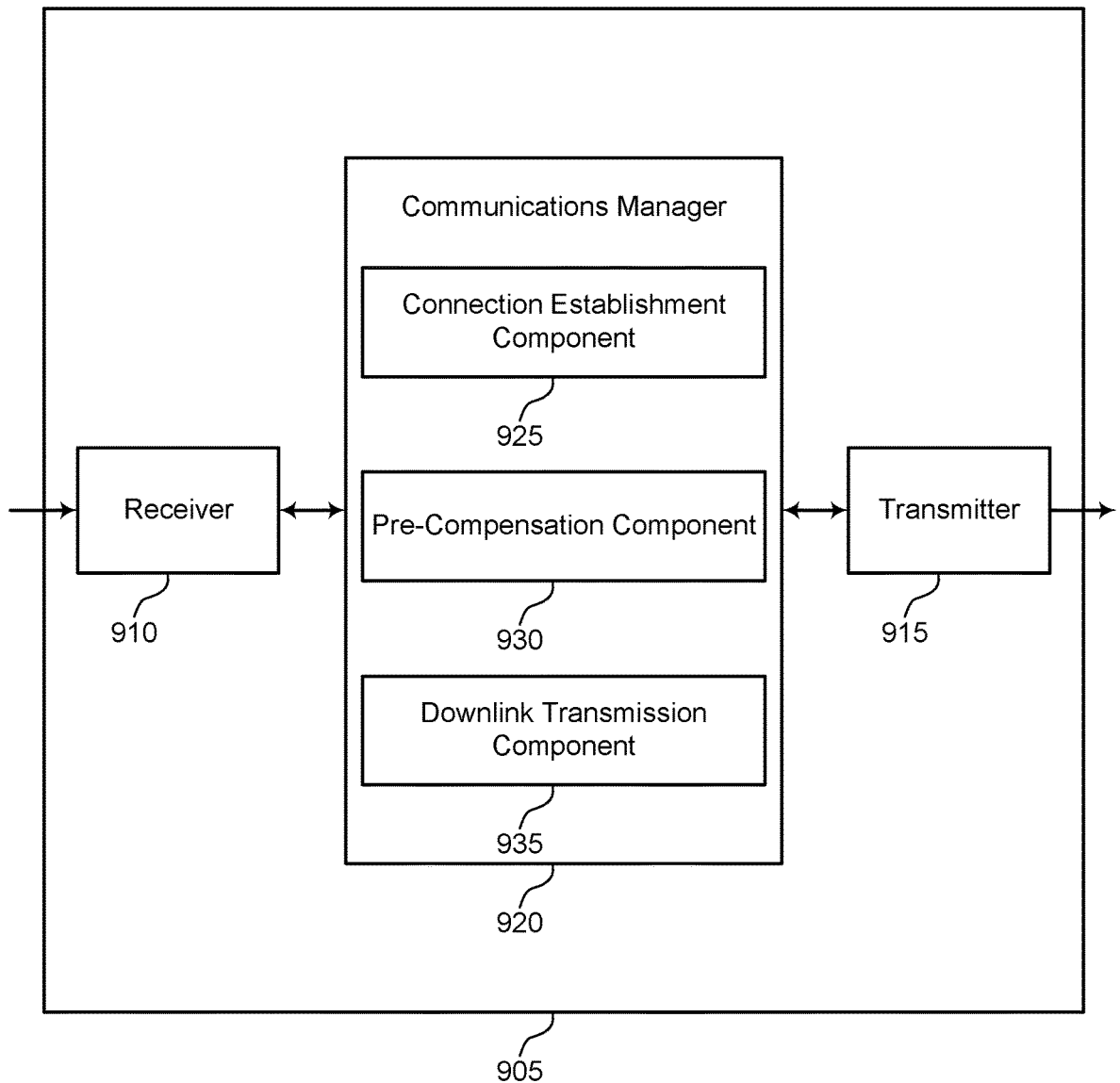

FIG. 9 shows a block diagram of a device 905 that supports techniques for signaling a source of dominant noise at a UE in accordance with aspects of the present disclosure. The device 905 may be an example of aspects of a device 805 or a base station 105. The device 905 may include a receiver 910, a transmitter 915, and a communications manager 920. The communications manager 920 can be implemented, at least in part, by one or both of a modem and a processor. Each of these components may be in communication with one another (for example, via one or more buses).

The receiver 910 may provide a means for receiving information such as packets, user data, control information, or any combination thereof associated with various information channels (for example, control channels, data channels, information channels related to techniques for signaling a source of dominant noise at a UE). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (for example, control channels, data channels, information channels related to techniques for signaling a source of dominant noise at a UE). In some examples, the transmitter 915 may be co-located with a receiver 910 in a transceiver component. The transmitter 915 may utilize a single antenna or a set of multiple antennas.

The device 905, or various components thereof, may be an example of means for performing various aspects of techniques for signaling a source of dominant noise at a UE 115. For example, the communications manager 920 may include a connection establishment component 925, a pre-compensation component 930, a downlink transmission component 935, or any combination thereof. In some examples, the communications manager 920, or various components thereof, may be configured to perform various operations (for example, receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations.

The communications manager 920 may support wireless communication at a base station in accordance with examples as disclosed herein. The connection establishment component 925 may be configured as or otherwise support a means for initiating a connection establishment procedure with a UE. The pre-compensation component 930 may be configured as or otherwise support a means for transmitting, to the UE, a capability report indicating one or more first communication factors for which the base station is capable of compensating downlink communication to the UE. The pre-compensation component 930 may be configured as or otherwise support a means for receiving, from the UE, an indication of one or more second communication factors from a set of communication factors based on a downlink channel between the base station and the UE. The downlink transmission component 935 may be configured as or otherwise support a means for transmitting, to the UE, a downlink transmission that is compensated for at least one of the one or more second communication factors.

Figure 10:
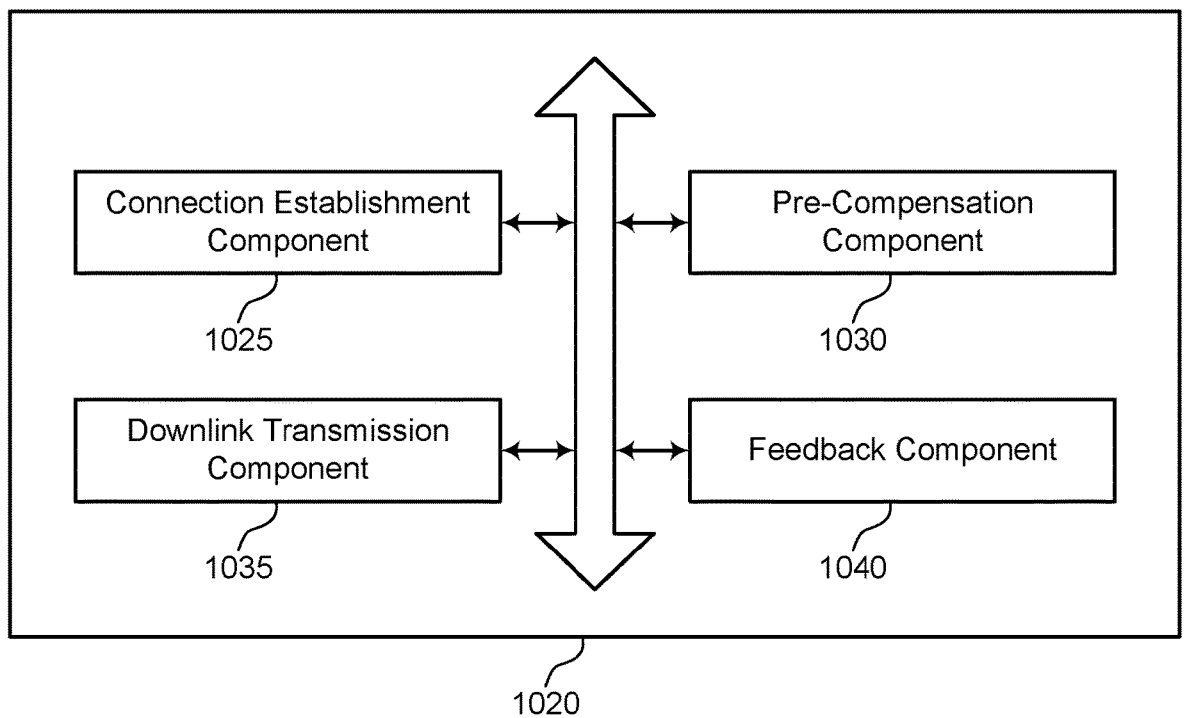
FIG. 10 shows a block diagram of a communications manager that supports techniques for signaling a source of dominant noise at a UE in accordance with aspects of the present disclosure.

FIG. 10 shows a block diagram of a communications manager 1020 that supports techniques for signaling a source of dominant noise at a UE in accordance with aspects of the present disclosure. The communications manager 1020, or various components thereof, may be an example of means for performing various aspects of techniques for signaling a source of dominant noise at a UE 115. For example, the communications manager 1020 may include a connection establishment component 1025, a pre-compensation component 1030, a downlink transmission component 1035, a feedback component 1040, or any combination thereof. Each of these components may communicate, directly or indirectly, with one another (for example, via one or more buses).

The communications manager 1020 may support wireless communication at a base station in accordance with examples as disclosed herein. The connection establishment component 1025 may be configured as or otherwise support a means for initiating a connection establishment procedure with a UE. The pre-compensation component 1030 may be configured as or otherwise support a means for transmitting, to the UE, a capability report indicating one or more first communication factors for which the base station is capable of compensating downlink communication to the UE. In some examples, the pre-compensation component 1030 may be configured as or otherwise support a means for receiving, from the UE, an indication of one or more second communication factors from a set of communication factors based on a downlink channel between the base station and the UE. The downlink transmission component 1035 may be configured as or otherwise support a means for transmitting, to the UE, a downlink transmission that is compensated for at least one of the one or more second communication factors.

In some examples, the pre-compensation component 1030 may be configured as or otherwise support a means for determining that the one or more second communication factors will use a greater amount of resources for processing at the UE relative to a remainder of the set of communication factors. In some examples, transmitting the downlink transmission that is compensated for at least the one of the one or more second communication factors is based on the determining. In some examples, to support determining that the one or more second communication factors will use the greater amount of resources for processing at the UE relative to the remainder of the set of communication factors, the pre-compensation component 1030 may be configured as or otherwise support a means for determining that the one or more second communication factors will use a greater amount of resources for processing at the UE than for processing at the base station.

In some examples, the pre-compensation component 1030 may be configured as or otherwise support a means for receiving, from the UE, a second indication of one or more third communication factors from the set of communication factors based on the downlink channel between the base station and the UE. In some examples, the downlink transmission component 1035 may be configured as or otherwise support a means for transmitting, to the UE, a second downlink transmission compensated for at least one of the one or more third communication factors.

In some examples, the feedback component 1040 may be configured as or otherwise support a means for transmitting, to the UE, a feedback message indicating a confirmation of compensation by the base station for each of the one or more second communication factors or a deferment of compensation for each of the one or more second communication factors. In some examples, the one or more second communication factors include a subset of the one or more first communication factors.

In some examples, to support transmitting the downlink transmission, the downlink transmission component 1035 may be configured as or otherwise support a means for transmitting the downlink transmission that is compensated for the one or more first communication factors and for the at least one of the one or more second communication factors, and the one or more second communication factors may be different than the one or more first communication factors.

In some examples, the downlink transmission component 1035 may be configured as or otherwise support a means for transmitting, to the UE, a message requesting the indication of the one or more second communication factors. In some examples, receiving the indication of the one or more second communication factors is based on transmitting the message.

In some examples, the set of communication factors includes one or more of a phase noise impairment, an in-phase and quadrature-phase mismatch impairment, a Doppler shift impairment, a frequency offset impairment, or a spur impairment.

Figure 11:
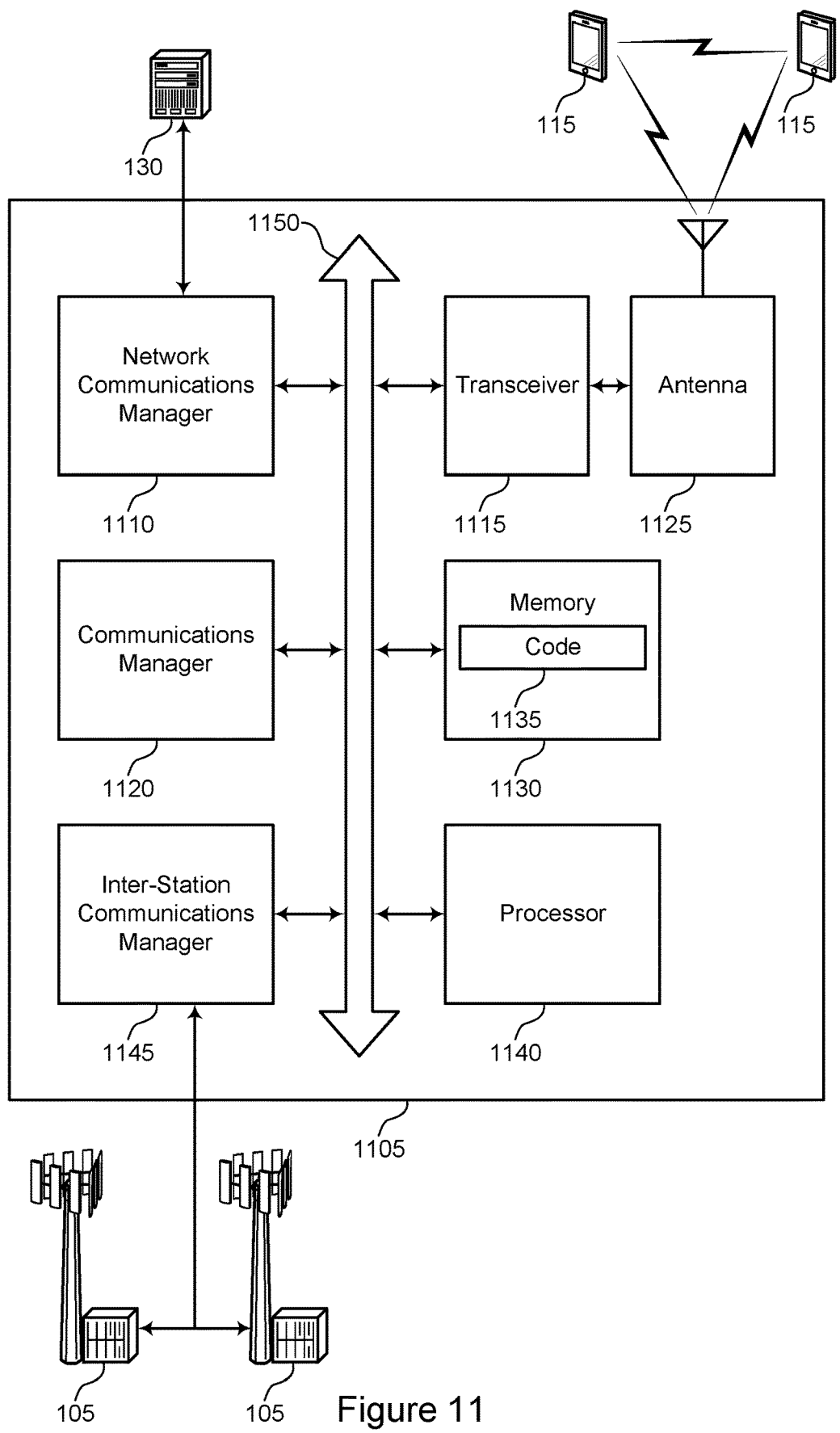
FIG. 11 shows a diagram of a system including a device that supports techniques for signaling a source of dominant noise at a UE in accordance with aspects of the present disclosure.

FIG. 11 shows a diagram of a system including a device 1105 that supports techniques for signaling a source of dominant noise at a UE in accordance with aspects of the present disclosure. The device 1105 may be an example of or include the components of a device 805, a device 905, or a base station 105. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (for example, operatively, communicatively, functionally, electronically, electrically) via one or more buses (for example, a bus 1150).

The network communications manager 1110 may manage communications with a core network 130 (for example, via one or more wired backhaul links). For example, the network communications manager 1110 may manage the transfer of data communications for client devices, such as one or more UEs 115.

In some examples, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof.

The memory 1130 may include RAM and ROM. The memory 1130 may store computer-readable, computer-executable code 1135 including instructions that, if executed by the processor 1140, cause the device 1105 to perform various functions described herein. The code 1135 may be stored in a non-transitory computer-readable medium such as system memory or another type of memory. In some examples, the code 1135 may not be directly executable by the processor 1140 but may cause a computer (for example, if compiled and executed) to perform functions described herein. In some examples, the memory 1130 may contain, among other things, a BIOS which may control basic hardware or software operation such as the interaction with peripheral components or devices.

The processor 1140 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1140 may be configured to operate a memory array using a memory controller. In some other cases, a memory controller may be integrated into the processor 1140. The processor 1140 may be configured to execute computer-readable instructions stored in a memory (for example, the memory 1130) to cause the device 1105 to perform various functions (for example, functions or tasks supporting techniques for signaling a source of dominant noise at a UE). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for initiating a connection establishment procedure with a UE. The communications manager 1120 may be configured as or otherwise support a means for transmitting, to the UE, a capability report indicating one or more first communication factors for which the base station is capable of compensating downlink communication to the UE. The communications manager 1120 may be configured as or otherwise support a means for receiving, from the UE, an indication of one or more second communication factors from a set of communication factors based on a downlink channel between the base station and the UE. The communications manager 1120 may be configured as or otherwise support a means for transmitting, to the UE, a downlink transmission that is compensated for at least one of the one or more second communication factors.

By including or configuring the communications manager 1120 in accordance with implementations of the present disclosure, the device 1105 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1120 may be configured to perform various operations (for example, receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for signaling a source of dominant noise at a UE 115, or the processor 1140 and the memory 1130 may be otherwise configured to perform or support such operations.

Figure 12:
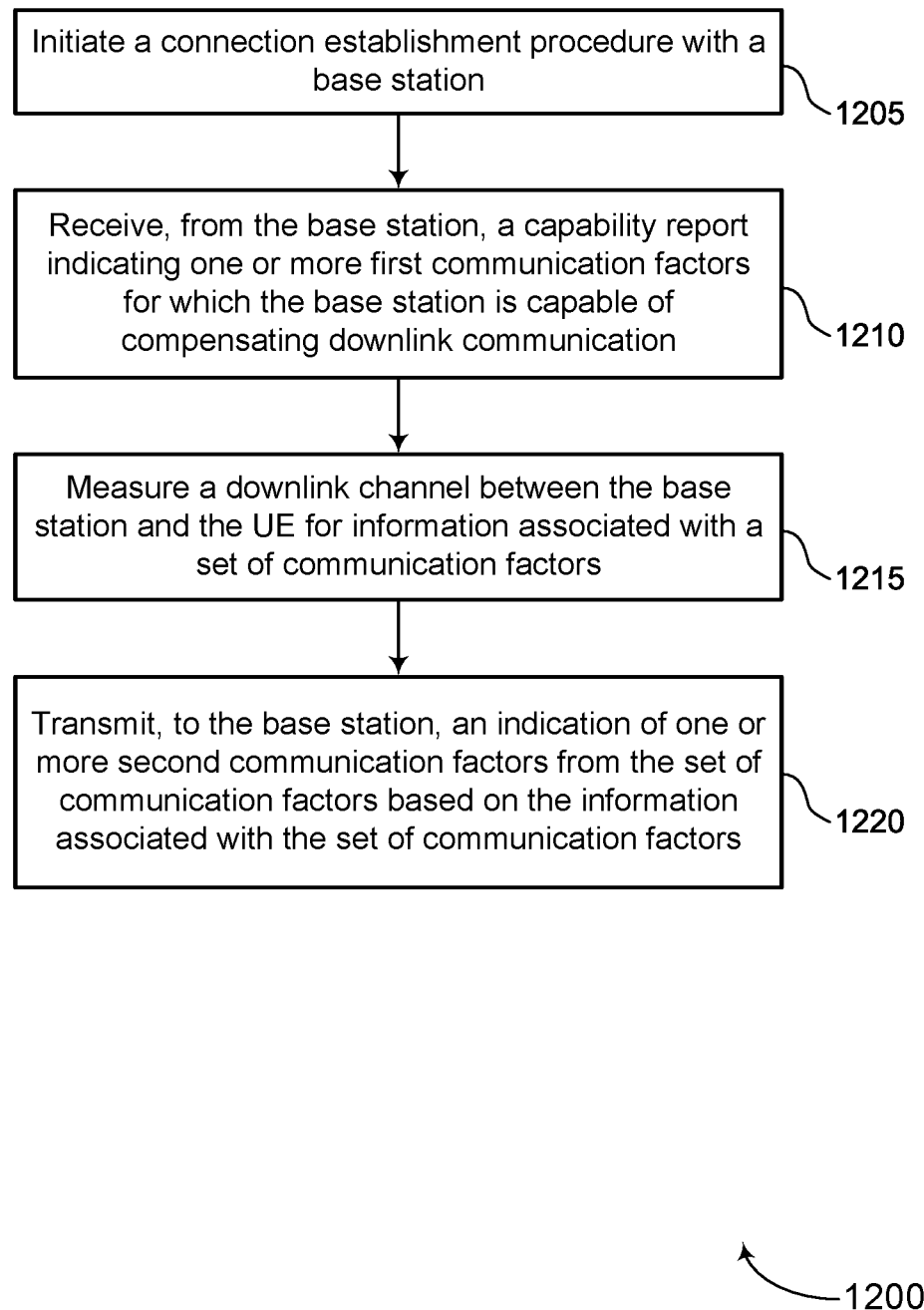
FIGS. 12-18 show flowcharts illustrating methods that support techniques for signaling a source of dominant noise at a UE in accordance with aspects of the present disclosure.

FIG. 12 shows a flowchart illustrating a method 1200 that supports techniques for signaling a source of dominant noise at a UE in accordance with aspects of the present disclosure. The operations of the method 1200 may be implemented by a UE or its components. For example, the operations of the method 1200 may be performed by a UE 115 as described with reference to FIGS. 1-7. In some examples, a UE may execute a set of instructions to control the functional elements of the UE to perform the described functions. Additionally or alternatively, the UE may perform aspects of the described functions using special-purpose hardware.

At 1205, the method may include initiating a connection establishment procedure with a base station. The operations of 1205 may be performed in accordance with examples as disclosed herein. In some examples, aspects of the operations of 1205 may be performed by a connection establishment component 625 as described with reference to FIG. 6.

At 1210, the method may include receiving, from the base station, a capability report indicating one or more first communication factors for which the base station is capable of compensating downlink communication. The operations of 1210 may be performed in accordance with examples as disclosed herein. In some examples, aspects of the operations of 1210 may be performed by a pre-compensation component 630 as described with reference to FIG. 6.

At 1215, the method may include measuring a downlink channel between the base station and the UE for information associated with a set of communication factors. The operations of 1215 may be performed in accordance with examples as disclosed herein. In some examples, aspects of the operations of 1215 may be performed by a channel measurement component 635 as described with reference to FIG. 6.

At 1220, the method may include transmitting, to the base station, an indication of one or more second communication factors from the set of communication factors based on the information associated with the set of communication factors. The operations of 1220 may be performed in accordance with examples as disclosed herein. In some examples, aspects of the operations of 1220 may be performed by a pre-compensation component 630 as described with reference to FIG. 6.

Figure 13:
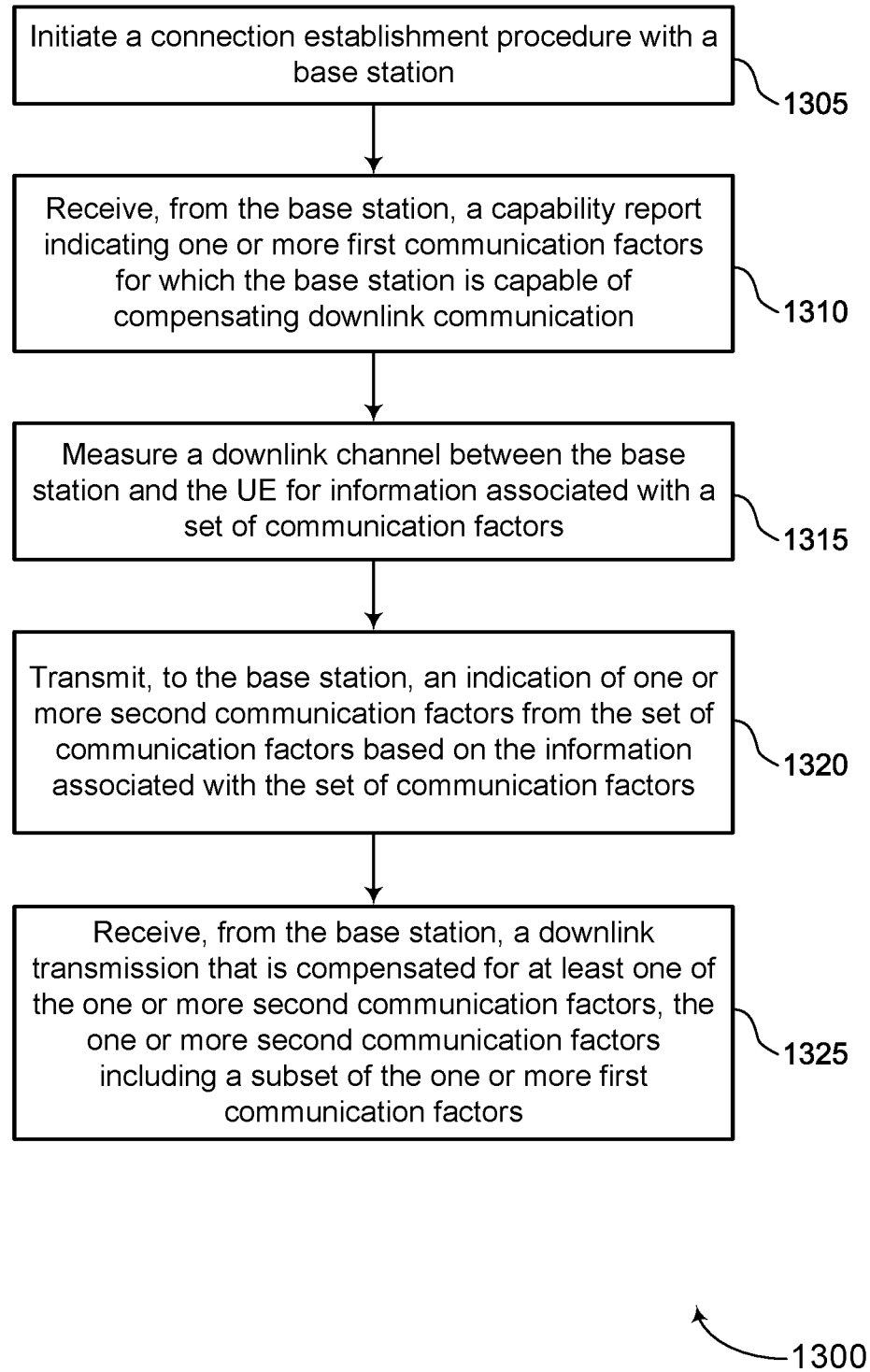

FIG. 13 shows a flowchart illustrating a method 1300 that supports techniques for signaling a source of dominant noise at a UE in accordance with aspects of the present disclosure. The operations of the method 1300 may be implemented by a UE or its components. For example, the operations of the method 1300 may be performed by a UE 115 as described with reference to FIGS. 1-7. In some examples, a UE may execute a set of instructions to control the functional elements of the UE to perform the described functions. Additionally or alternatively, the UE may perform aspects of the described functions using special-purpose hardware.

At 1305, the method may include initiating a connection establishment procedure with a base station. The operations of 1305 may be performed in accordance with examples as disclosed herein. In some examples, aspects of the operations of 1305 may be performed by a connection establishment component 625 as described with reference to FIG. 6.

At 1310, the method may include receiving, from the base station, a capability report indicating one or more first communication factors for which the base station is capable of compensating downlink communication. The operations of 1310 may be performed in accordance with examples as disclosed herein. In some examples, aspects of the operations of 1310 may be performed by a pre-compensation component 630 as described with reference to FIG. 6.

At 1315, the method may include measuring a downlink channel between the base station and the UE for information associated with a set of communication factors. The operations of 1315 may be performed in accordance with examples as disclosed herein. In some examples, aspects of the operations of 1315 may be performed by a channel measurement component 635 as described with reference to FIG. 6.

At 1320, the method may include transmitting, to the base station, an indication of one or more second communication factors from the set of communication factors based on the information associated with the set of communication factors. The operations of 1320 may be performed in accordance with examples as disclosed herein. In some examples, aspects of the operations of 1320 may be performed by a pre-compensation component 630 as described with reference to FIG. 6.

At 1325, the method may include receiving, from the base station, a downlink transmission that is compensated for at least one of the one or more second communication factors, the one or more second communication factors including a subset of the one or more first communication factors. The operations of 1325 may be performed in accordance with examples as disclosed herein. In some examples, aspects of the operations of 1325 may be performed by a downlink reception component 640 as described with reference to FIG. 6.

Figure 14:
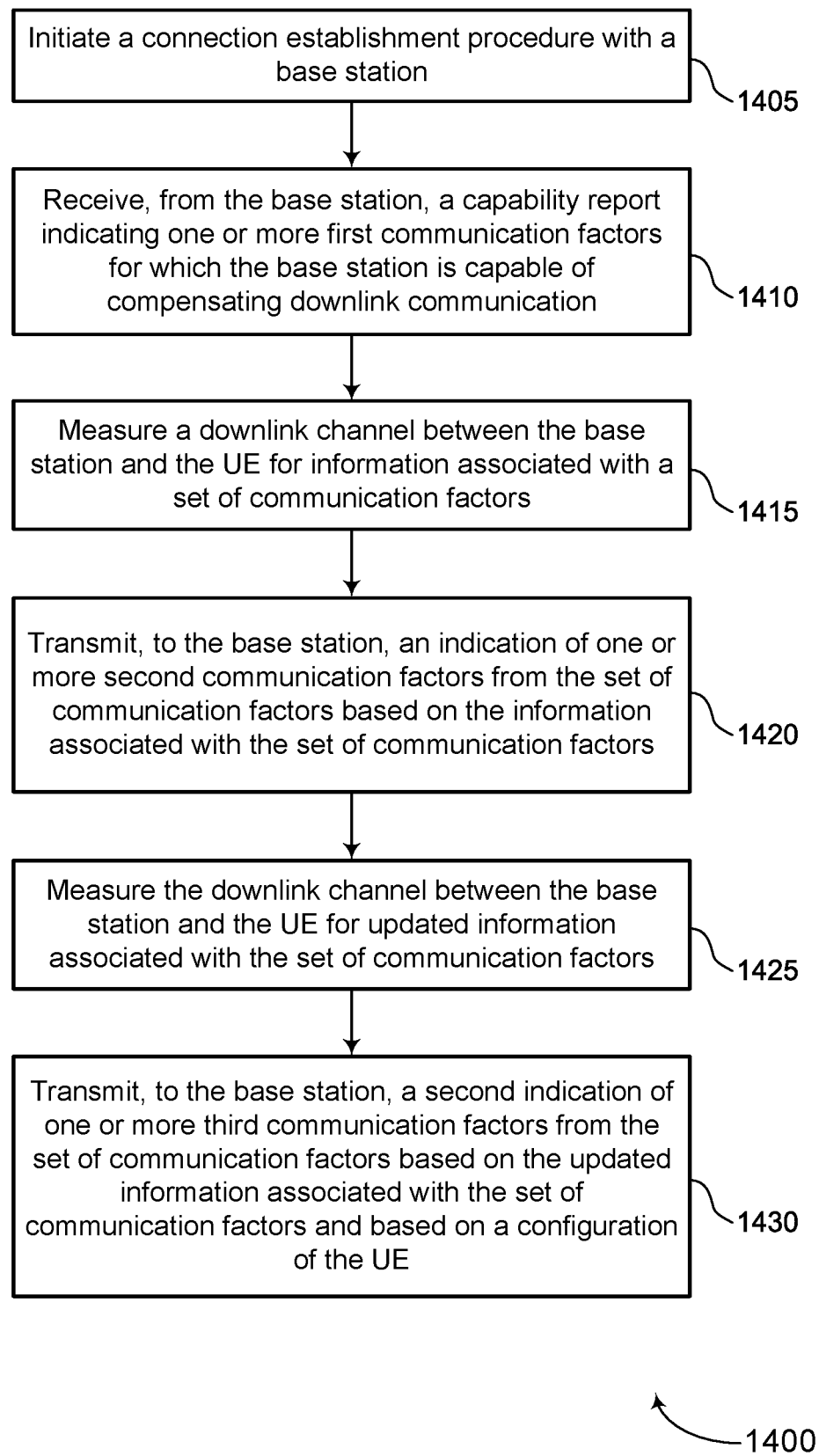

FIG. 14 shows a flowchart illustrating a method 1400 that supports techniques for signaling a source of dominant noise at a UE in accordance with aspects of the present disclosure. The operations of the method 1400 may be implemented by a UE or its components. For example, the operations of the method 1400 may be performed by a UE 115 as described with reference to FIGS. 1-7. In some examples, a UE may execute a set of instructions to control the functional elements of the UE to perform the described functions. Additionally or alternatively, the UE may perform aspects of the described functions using special-purpose hardware.

At 1405, the method may include initiating a connection establishment procedure with a base station. The operations of 1405 may be performed in accordance with examples as disclosed herein. In some examples, aspects of the operations of 1405 may be performed by a connection establishment component 625 as described with reference to FIG. 6.

At 1410, the method may include receiving, from the base station, a capability report indicating one or more first communication factors for which the base station is capable of compensating downlink communication. The operations of 1410 may be performed in accordance with examples as disclosed herein. In some examples, aspects of the operations of 1410 may be performed by a pre-compensation component 630 as described with reference to FIG. 6.

At 1415, the method may include measuring a downlink channel between the base station and the UE for information associated with a set of communication factors. The operations of 1415 may be performed in accordance with examples as disclosed herein. In some examples, aspects of the operations of 1415 may be performed by a channel measurement component 635 as described with reference to FIG. 6.

At 1420, the method may include transmitting, to the base station, an indication of one or more second communication factors from the set of communication factors based on the information associated with the set of communication factors. The operations of 1420 may be performed in accordance with examples as disclosed herein. In some examples, aspects of the operations of 1420 may be performed by a pre-compensation component 630 as described with reference to FIG. 6.

At 1425, the method may include measuring the downlink channel between the base station and the UE for updated information associated with the set of communication factors. The operations of 1425 may be performed in accordance with examples as disclosed herein. In some examples, aspects of the operations of 1425 may be performed by a channel measurement component 635 as described with reference to FIG. 6.

At 1430, the method may include transmitting, to the base station, a second indication of one or more third communication factors from the set of communication factors based on the updated information associated with the set of communication factors and based on a configuration of the UE. The operations of 1430 may be performed in accordance with examples as disclosed herein. In some examples, aspects of the operations of 1430 may be performed by a pre-compensation component 630 as described with reference to FIG. 6.

Figure 15:
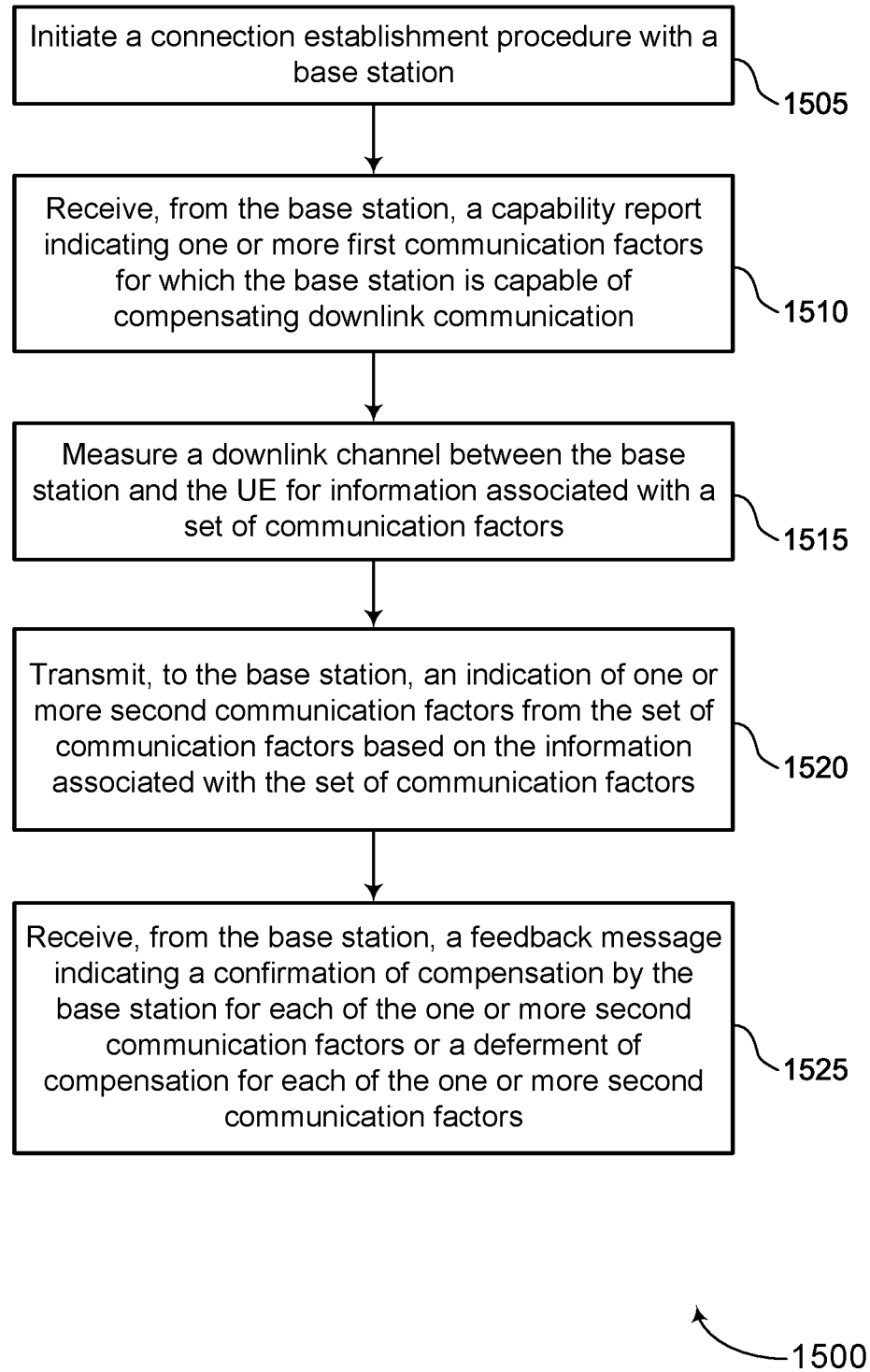

FIG. 15 shows a flowchart illustrating a method 1500 that supports techniques for signaling a source of dominant noise at a UE in accordance with aspects of the present disclosure. The operations of the method 1500 may be implemented by a UE or its components. For example, the operations of the method 1500 may be performed by a UE 115 as described with reference to FIGS. 1-7. In some examples, a UE may execute a set of instructions to control the functional elements of the UE to perform the described functions. Additionally or alternatively, the UE may perform aspects of the described functions using special-purpose hardware.

At 1505, the method may include initiating a connection establishment procedure with a base station. The operations of 1505 may be performed in accordance with examples as disclosed herein. In some examples, aspects of the operations of 1505 may be performed by a connection establishment component 625 as described with reference to FIG. 6.

At 1510, the method may include receiving, from the base station, a capability report indicating one or more first communication factors for which the base station is capable of compensating downlink communication. The operations of 1510 may be performed in accordance with examples as disclosed herein. In some examples, aspects of the operations of 1510 may be performed by a pre-compensation component 630 as described with reference to FIG. 6.

At 1515, the method may include measuring a downlink channel between the base station and the UE for information associated with a set of communication factors. The operations of 1515 may be performed in accordance with examples as disclosed herein. In some examples, aspects of the operations of 1515 may be performed by a channel measurement component 635 as described with reference to FIG. 6.

At 1520, the method may include transmitting, to the base station, an indication of one or more second communication factors from the set of communication factors based on the information associated with the set of communication factors. The operations of 1520 may be performed in accordance with examples as disclosed herein. In some examples, aspects of the operations of 1520 may be performed by a pre-compensation component 630 as described with reference to FIG. 6.

At 1525, the method may include receiving, from the base station, a feedback message indicating a confirmation of compensation by the base station for each of the one or more second communication factors or a deferment of compensation for each of the one or more second communication factors. The operations of 1525 may be performed in accordance with examples as disclosed herein. In some examples, aspects of the operations of 1525 may be performed by a feedback component 645 as described with reference to FIG. 6.

Figure 16:
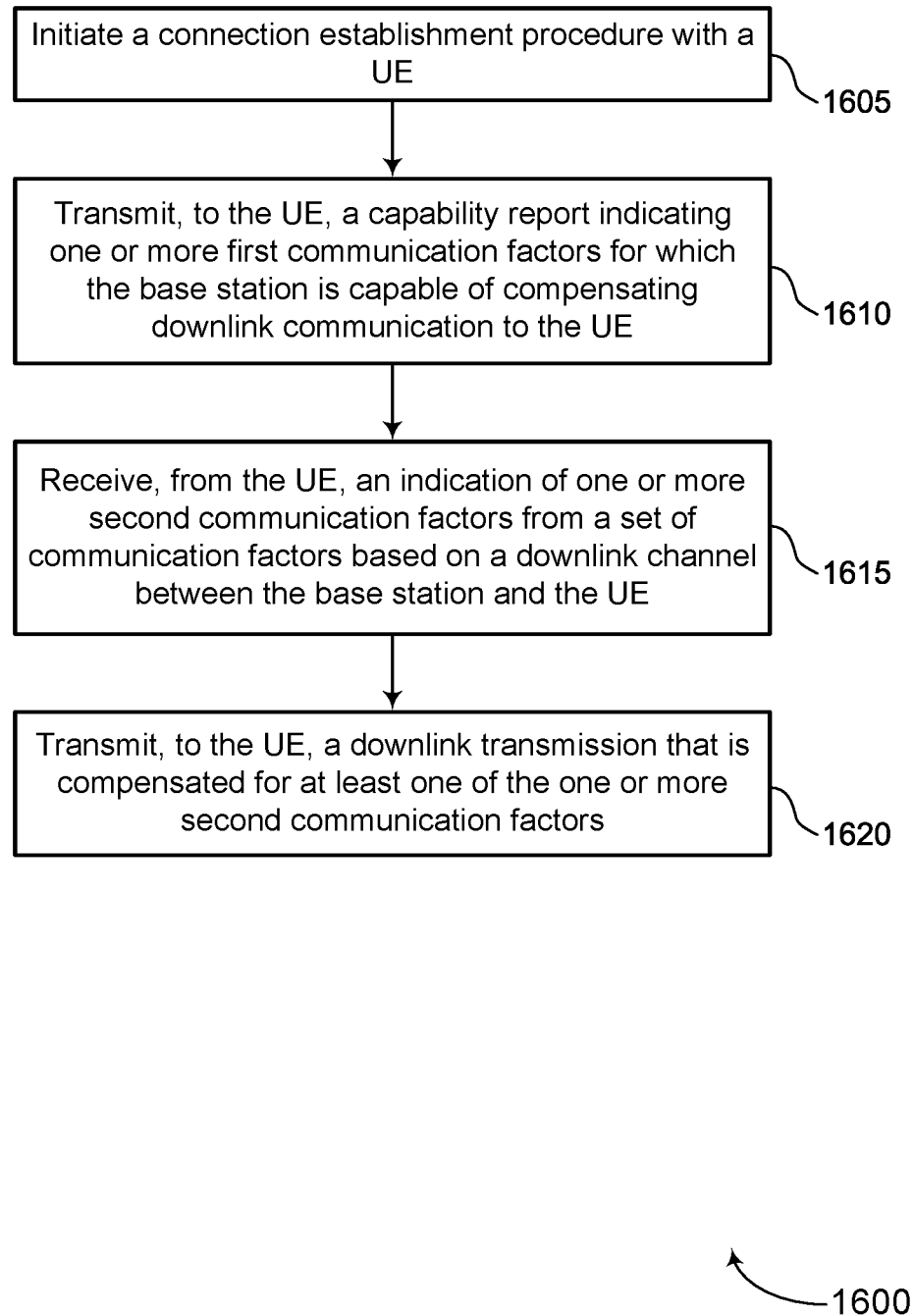

FIG. 16 shows a flowchart illustrating a method 1600 that supports techniques for signaling a source of dominant noise at a UE in accordance with aspects of the present disclosure. The operations of the method 1600 may be implemented by a base station or its components. For example, the operations of the method 1600 may be performed by a base station 105 as described with reference to FIGS. 1-3 and 8-11. In some examples, a base station may execute a set of instructions to control the functional elements of the base station to perform the described functions. Additionally or alternatively, the base station may perform aspects of the described functions using special-purpose hardware.

At 1605, the method may include initiating a connection establishment procedure with a UE. The operations of 1605 may be performed in accordance with examples as disclosed herein. In some examples, aspects of the operations of 1605 may be performed by a connection establishment component 1025 as described with reference to FIG. 10.

At 1610, the method may include transmitting, to the UE, a capability report indicating one or more first communication factors for which the base station is capable of compensating downlink communication to the UE. The operations of 1610 may be performed in accordance with examples as disclosed herein. In some examples, aspects of the operations of 1610 may be performed by a pre-compensation component 1030 as described with reference to FIG. 10.

At 1615, the method may include receiving, from the UE, an indication of one or more second communication factors from a set of communication factors based on a downlink channel between the base station and the UE. The operations of 1615 may be performed in accordance with examples as disclosed herein. In some examples, aspects of the operations of 1615 may be performed by a pre-compensation component 1030 as described with reference to FIG. 10.

At 1620, the method may include transmitting, to the UE, a downlink transmission that is compensated for at least one of the one or more second communication factors. The operations of 1620 may be performed in accordance with examples as disclosed herein. In some examples, aspects of the operations of 1620 may be performed by a downlink transmission component 1035 as described with reference to FIG. 10.

Figure 17:
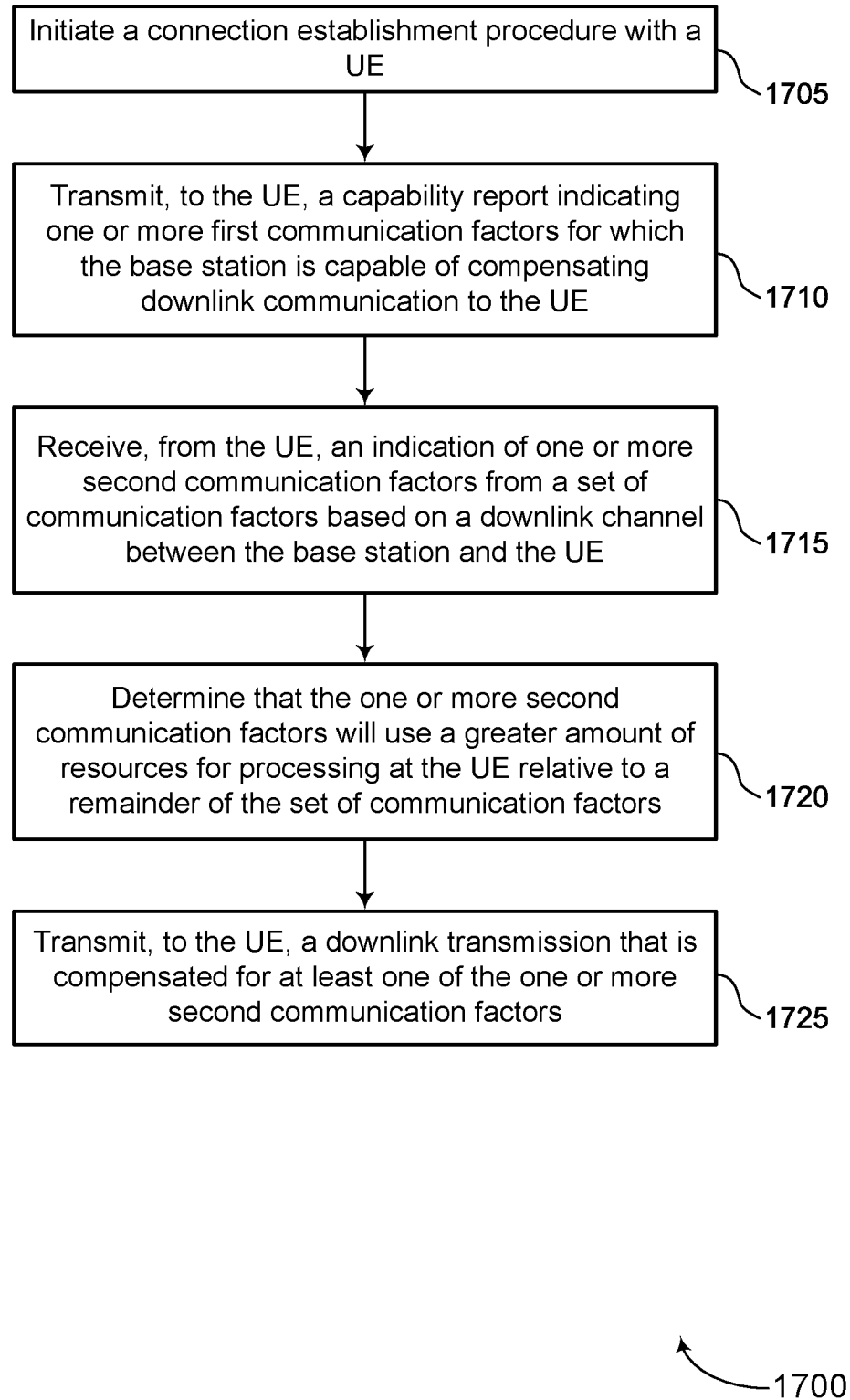

FIG. 17 shows a flowchart illustrating a method 1700 that supports techniques for signaling a source of dominant noise at a UE in accordance with aspects of the present disclosure. The operations of the method 1700 may be implemented by a base station or its components. For example, the operations of the method 1700 may be performed by a base station 105 as described with reference to FIGS. 1-3 and 8-11. In some examples, a base station may execute a set of instructions to control the functional elements of the base station to perform the described functions. Additionally or alternatively, the base station may perform aspects of the described functions using special-purpose hardware.

At 1705, the method may include initiating a connection establishment procedure with a UE. The operations of 1705 may be performed in accordance with examples as disclosed herein. In some examples, aspects of the operations of 1705 may be performed by a connection establishment component 1025 as described with reference to FIG. 10.

At 1710, the method may include transmitting, to the UE, a capability report indicating one or more first communication factors for which the base station is capable of compensating downlink communication to the UE. The operations of 1710 may be performed in accordance with examples as disclosed herein. In some examples, aspects of the operations of 1710 may be performed by a pre-compensation component 1030 as described with reference to FIG. 10.

At 1715, the method may include receiving, from the UE, an indication of one or more second communication factors from a set of communication factors based on a downlink channel between the base station and the UE. The operations of 1715 may be performed in accordance with examples as disclosed herein. In some examples, aspects of the operations of 1715 may be performed by a pre-compensation component 1030 as described with reference to FIG. 10.

At 1720, the method may include determining that the one or more second communication factors will use a greater amount of resources for processing at the UE relative to a remainder of the set of communication factors. The operations of 1720 may be performed in accordance with examples as disclosed herein. In some examples, aspects of the operations of 1720 may be performed by a pre-compensation component 1030 as described with reference to FIG. 10.

At 1725, the method may include transmitting, to the UE, a downlink transmission that is compensated for at least one of the one or more second communication factors. The operations of 1725 may be performed in accordance with examples as disclosed herein. In some examples, aspects of the operations of 1725 may be performed by a downlink transmission component 1035 as described with reference to FIG. 10.

Figure 18:
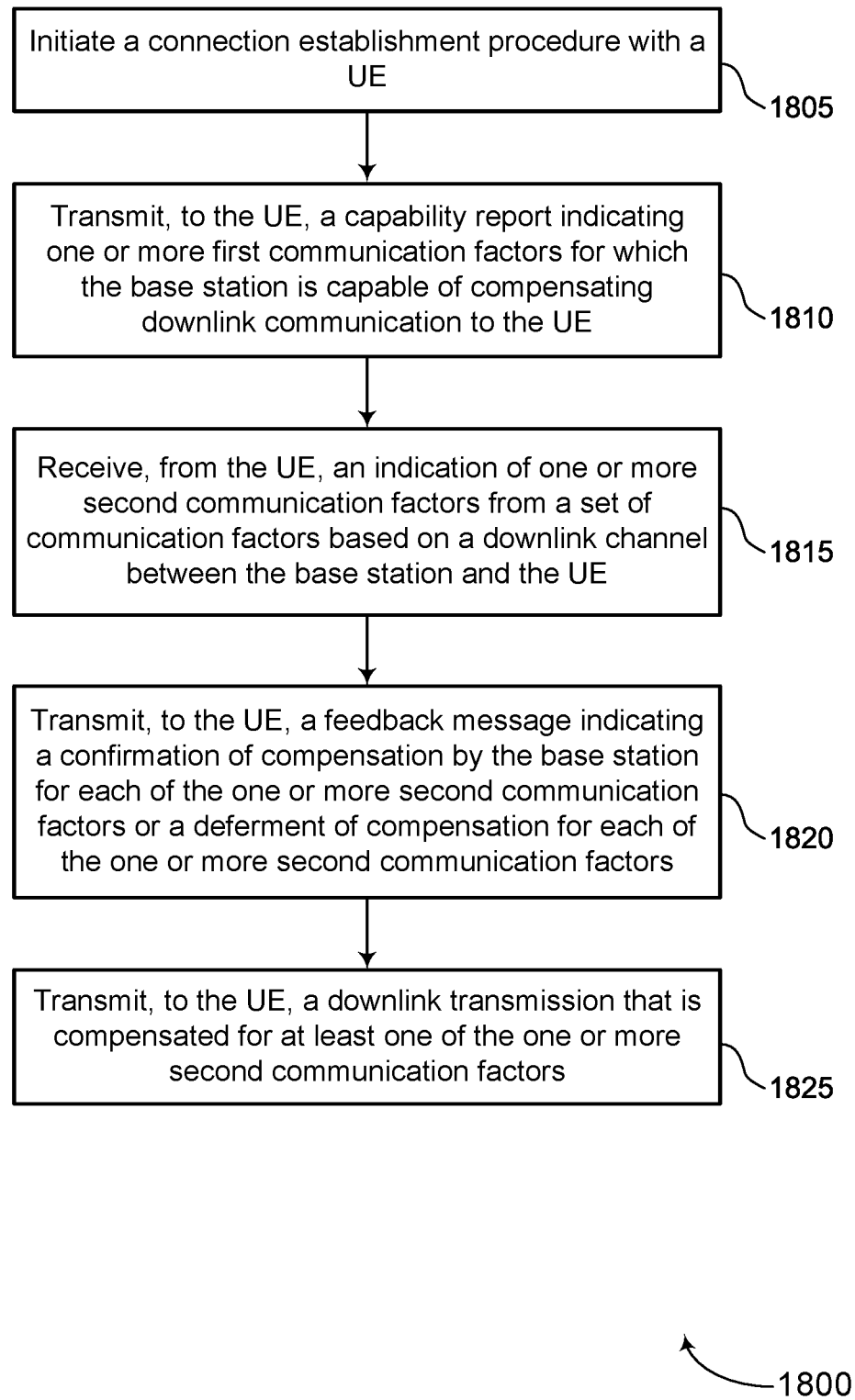

FIG. 18 shows a flowchart illustrating a method 1800 that supports techniques for signaling a source of dominant noise at a UE in accordance with aspects of the present disclosure. The operations of the method 1800 may be implemented by a base station or its components. For example, the operations of the method 1800 may be performed by a base station 105 as described with reference to FIGS. 1-3 and 8-11. In some examples, a base station may execute a set of instructions to control the functional elements of the base station to perform the described functions. Additionally or alternatively, the base station may perform aspects of the described functions using special-purpose hardware.

At 1805, the method may include initiating a connection establishment procedure with a UE. The operations of 1805 may be performed in accordance with examples as disclosed herein. In some examples, aspects of the operations of 1805 may be performed by a connection establishment component 1025 as described with reference to FIG. 10.

At 1810, the method may include transmitting, to the UE, a capability report indicating one or more first communication factors for which the base station is capable of compensating downlink communication to the UE. The operations of 1810 may be performed in accordance with examples as disclosed herein. In some examples, aspects of the operations of 1810 may be performed by a pre-compensation component 1030 as described with reference to FIG. 10.

At 1815, the method may include receiving, from the UE, an indication of one or more second communication factors from a set of communication factors based on a downlink channel between the base station and the UE. The operations of 1815 may be performed in accordance with examples as disclosed herein. In some examples, aspects of the operations of 1815 may be performed by a pre-compensation component 1030 as described with reference to FIG. 10.

At 1820, the method may include transmitting, to the UE, a feedback message indicating a confirmation of compensation by the base station for each of the one or more second communication factors or a deferment of compensation for each of the one or more second communication factors. The operations of 1820 may be performed in accordance with examples as disclosed herein. In some examples, aspects of the operations of 1820 may be performed by a feedback component 1040 as described with reference to FIG. 10.

At 1825, the method may include transmitting, to the UE, a downlink transmission that is compensated for at least one of the one or more second communication factors. The operations of 1825 may be performed in accordance with examples as disclosed herein. In some examples, aspects of the operations of 1825 may be performed by a downlink transmission component 1035 as described with reference to FIG. 10.

The following provides an overview of aspects of the present disclosure:

Aspect 1: A method for wireless communication at a UE, comprising: initiating a connection establishment procedure with a base station; receiving, from the base station, a capability report indicating one or more first communication factors for which the base station is capable of compensating downlink communication; measuring a downlink channel between the base station and the UE for information associated with a set of communication factors; and transmitting, to the base station, an indication of one or more second communication factors from the set of communication factors based at least in part on the information associated with the set of communication factors.

Aspect 2: The method of aspect 1, further comprising: receiving, from the base station, a downlink transmission that is compensated for at least one of the one or more second communication factors, wherein the one or more second communication factors include a subset of the one or more first communication factors.

Aspect 3: The method of aspect 1, wherein the capability report indicates that the base station compensates the downlink communication for the one or more first communication factors, the method further comprising: receiving, from the base station, a downlink transmission that is compensated for the one or more first communication factors and for at least one of the one or more second communication factors, wherein the one or more second communication factors are different than the one or more first communication factors.

Aspect 4: The method of any of aspects 1-3, wherein transmitting the indication of the one or more second communication factors comprises: transmitting the indication of the one or more second communication factors based at least in part on a severity of each of the set of communication factors, wherein the severity of each of the set of communication factors is based at least in part on measuring the downlink channel for the information associated with the set of communication factors.

Aspect 5: The method of aspect 4, wherein the one or more second communication factors have a greater severity relative to a remainder of the set of communication factors.

Aspect 6: The method of any of aspects 1-5, wherein transmitting the indication of the one or more second communication factors comprises: transmitting the indication of the one or more second communication factors based at least in part on estimating an amount of resources to be used to process each of the set of communication factors.

Aspect 7: The method of aspect 6, wherein the one or more second communication factors are estimated to use a greater amount of resources for processing relative to a remainder of the set of communication factors.

Aspect 8: The method of any of aspects 1-7, further comprising: measuring the downlink channel between the base station and the UE for updated information associated with the set of communication factors; and transmitting, to the base station, a second indication of one or more third communication factors from the set of communication factors based at least in part on the updated information associated with the set of communication factors and based at least in part on a configuration of the UE.

Aspect 9: The method of any of aspects 1-8, further comprising: receiving, from the base station, a feedback message indicating a confirmation of compensation by the base station for each of the one or more second communication factors or a deferment of compensation for each of the one or more second communication factors.

Aspect 10: The method of any of aspects 1-9, further comprising: receiving, from the base station, a message requesting the indication of the one or more second communication factors, wherein transmitting the indication of the one or more second communication factors is based at least in part on receiving the message.

Aspect 11: The method of any of aspects 1-10, wherein the set of communication factors comprises one or more of a phase noise impairment, an IQ mismatch impairment, a Doppler shift impairment, a frequency offset impairment, or a spur impairment.

Aspect 12: A method for wireless communication at a base station, comprising: initiating a connection establishment procedure with a UE; transmitting, to the UE, a capability report indicating one or more first communication factors for which the base station is capable of compensating downlink communication to the UE; receiving, from the UE, an indication of one or more second communication factors from a set of communication factors based at least in part on a downlink channel between the base station and the UE; and transmitting, to the UE, a downlink transmission that is compensated for at least one of the one or more second communication factors.

Aspect 13: The method of aspect 12, further comprising: determining that the one or more second communication factors will use a greater amount of resources for processing at the UE relative to a remainder of the set of communication factors, wherein transmitting the downlink transmission that is compensated for at least the one of the one or more second communication factors is based at least in part on the determining.

Aspect 14: The method of aspect 13, wherein determining that the one or more second communication factors will use the greater amount of resources for processing at the UE relative to the remainder of the set of communication factors further comprises: determining that the one or more second communication factors will use a greater amount of resources for processing at the UE than for processing at the base station.

Aspect 15: The method of any of aspects 12-14, further comprising: receiving, from the UE, a second indication of one or more third communication factors from the set of communication factors based at least in part on the downlink channel between the base station and the UE; and transmitting, to the UE, a second downlink transmission compensated for at least one of the one or more third communication factors.

Aspect 16: The method of any of aspects 12-15, further comprising: transmitting, to the UE, a feedback message indicating a confirmation of compensation by the base station for each of the one or more second communication factors or a deferment of compensation for each of the one or more second communication factors.

Aspect 17: The method of any of aspects 12-16, wherein the one or more second communication factors include a subset of the one or more first communication factors.

Aspect 18: The method of any of aspects 12-16, wherein the capability report indicates that the base station compensates the downlink communication for the one or more first communication factors, and wherein transmitting the downlink transmission further comprises: transmitting the downlink transmission that is compensated for the one or more first communication factors and for the at least one of the one or more second communication factors, wherein the one or more second communication factors are different than the one or more first communication factors.

Aspect 19: The method of any of aspects 12-18, further comprising: transmitting, to the UE, a message requesting the indication of the one or more second communication factors, wherein receiving the indication of the one or more second communication factors is based at least in part on transmitting the message.

Aspect 20: The method of any of aspects 12-19, wherein the set of communication factors comprises one or more of a phase noise impairment, an IQ mismatch impairment, a Doppler shift impairment, a frequency offset impairment, or a spur impairment.

Aspect 21: An apparatus for wireless communication at a UE, comprising a processor; memory coupled with the processor; and instructions stored in the memory and executable by the processor to cause the apparatus to perform a method of any of aspects 1-11.

Aspect 22: An apparatus for wireless communication at a UE, comprising at least one means for performing a method of any of aspects 1-11.

Aspect 23: A non-transitory computer-readable medium storing code for wireless communication at a UE, the code comprising instructions executable by a processor to perform a method of any of aspects 1-11.

Aspect 24: An apparatus for wireless communication at a base station, comprising a processor; memory coupled with the processor; and instructions stored in the memory and executable by the processor to cause the apparatus to perform a method of any of aspects 12-20.

Aspect 25: An apparatus for wireless communication at a base station, comprising at least one means for performing a method of any of aspects 12-20.

Aspect 26: A non-transitory computer-readable medium storing code for wireless communication at a base station, the code comprising instructions executable by a processor to perform a method of any of aspects 12-20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks usually reproduce data magnetically and discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:
1. A method for wireless communication by a user equipment (UE), comprising:
receiving, from a network device during a connection establishment procedure between the UE and the network device, a capability report indicating one or more first types of communication factors for which the network device is capable of compensating downlink communication;

measuring a downlink channel between the network device and the UE for information associated with a set of communication factors, the information associated with an amount of processing resources to compensate, at the UE, for each of the set of communication factors; and transmitting, to the network device, a request for compensation by the network device for one or more second types of communication factors from the set of communication factors based at least in part on the one or more second types of communication factors being associated with a greater amount of processing resources relative to a remainder of the set of communication factors.

2. The method of claim 1, further comprising receiving, from the network device, a downlink transmission that is compensated for at least one of the one or more second types of communication factors, wherein the one or more second types of communication factors comprise a subset of the one or more first types of communication factors.

3. The method of claim 1, wherein the capability report indicates that the network device compensates the downlink communication for the one or more first types of communication factors, the method further comprising:

receiving, from the network device, a downlink transmission that is compensated for the one or more first types of communication factors and for at least one of the one or more second types of communication factors, wherein the one or more second types of communication factors are different than the one or more first types of communication factors.

4. The method of claim 1, wherein transmitting the request for compensation by the network device for the one or more second types of communication factors is based at least in part on a severity of each of the set of communication factors, wherein the severity of each of the set of communication factors is based at least in part on measuring the downlink channel for the information associated with the set of communication factors.

5. The method of claim 4, wherein the one or more second types of communication factors have a greater severity relative to a remainder of the set of communication factors.

6. The method of claim 1, wherein transmitting the request for compensation by the network device for the one or more second types of communication factors is based at least in part on estimating the amount of processing resources to be used to compensate for each of the set of communication factors.

7. The method of claim 6, wherein the one or more second types of communication factors are estimated to use the greater amount of processing resources relative to the remainder of the set of communication factors.

8. The method of claim 1, further comprising:

measuring the downlink channel between the network device and the UE for updated information associated with the set of communication factors; and transmitting, to the network device, a second request for compensation by the network device for one or more third types of communication factors from the set of communication factors based at least in part on the updated information associated with the set of communication factors and based at least in part on a configuration of the UE.

9. The method of claim 1, further comprising receiving, from the network device, a feedback message indicating a confirmation of compensation by the network device for each of the one or more second types of communication factors or a deferment of compensation to the UE for each of the one or more second types of communication factors.

10. The method of claim 1, further comprising receiving, from the network device, a message requesting the request for compensation by the network device for the one or more second types of communication factors, wherein transmitting the request for compensation by the network device for the one or more second types of communication factors is based at least in part on receiving the message.

11. The method of claim 1, wherein the set of communication factors comprises one or more of a phase noise impairment, an in-phase and quadrature-phase mismatch impairment, a Doppler shift impairment, a frequency offset impairment, or a spur impairment.

12. A method for wireless communication by a network device, comprising:

transmitting, to a user equipment (UE) during a connection establishment procedure between the UE and the network device, a capability report indicating one or more first types of communication factors for which the network device is capable of compensating downlink communication to the UE;

receiving, from the UE, a request for compensation by the network device for one or more second types of communication factors from a set of communication factors based at least in part on a downlink channel between the network device and the UE and an amount of processing resources to compensate, at the UE, for each of the set of communication factors, the one or more second types of communication factors being associated with a greater amount of processing resources relative to a remainder of the set of communication factors; and transmitting, to the UE, a downlink transmission that is compensated for at least one of the one or more second types of communication factors.

13. The method of claim 12, further comprising determining that the one or more second types of communication factors will use the greater amount of processing resources at the UE relative to the remainder of the set of communication factors, wherein transmitting the downlink transmission that is compensated for at least the one of the one or more second types of communication factors is based at least in part on the determining.

14. The method of claim 13, wherein determining that the one or more second types of communication factors will use the greater amount of processing resources at the UE relative to the remainder of the set of communication factors further comprises determining that the one or more second types of communication factors will use a greater amount of processing resources at the UE than at the network device.

15. The method of claim 12, further comprising:

receiving, from the UE, a second request for compensation by the network device for one or more third types of communication factors from the set of communication factors based at least in part on the downlink channel between the network device and the UE; and transmitting, to the UE, a second downlink transmission compensated for at least one of the one or more third types of communication factors.

16. The method of claim 12, further comprising transmitting, to the UE, a feedback message indicating a confirmation of compensation by the network device for each of the one or more second types of communication factors or a deferment of compensation to the UE for each of the one or more second types of communication factors.

17. The method of claim 12, wherein the one or more second types of communication factors comprise a subset of the one or more first types of communication factors.

18. The method of claim 12, wherein the capability report indicates that the network device compensates the downlink communication for the one or more first types of communication factors, and wherein transmitting the downlink transmission further comprises:
transmitting the downlink transmission that is compensated for the one or more first types of communication factors and for at least the one of the one or more second types of communication factors, wherein the one or more second types of communication factors are different than the one or more first types of communication factors.

19. The method of claim 12, further comprising transmitting, to the UE, a message requesting the request for compensation by the network device for the one or more second types of communication factors, wherein receiving the request for compensation by the network device for the one or more second types of communication factors is based at least in part on transmitting the message.

20. The method of claim 12, wherein the set of communication factors comprises one or more of a phase noise impairment, an in-phase and quadrature-phase mismatch impairment, a Doppler shift impairment, a frequency offset impairment, or a spur impairment.

21. A user equipment (UE), comprising:
one or more memories storing processor-executable code; and
one or more processors coupled with the one or more memories and configured to, when executing the code, cause the UE to:
receive, from a network device during a connection establishment procedure between the UE and the network device, a capability report indicating one or more first types of communication factors for which the network device is capable of compensating downlink communication;
measure a downlink channel between the network device and the UE for information associated with a set of communication factors, the information associated with an amount of processing resources to compensate, at the UE, for each of the set of communication factors; and
transmit, to the network device, a request for compensation by the network device for one or more second types of communication factors from the set of communication factors based at least in part on the one or more second types of communication factors being associated with a greater amount of processing resources relative to a remainder of the set of communication factors.

22. The UE of claim 21, wherein the one or more processors are further configured to, when executing the code, cause the UE to receive, from the network device, a downlink transmission that is compensated for at least one of the one or more second types of communication factors, wherein the one or more second types of communication factors comprise a subset of the one or more first types of communication factors.

23. The UE of claim 21, wherein the capability report indicates that the network device compensates the downlink communication for the one or more first types of communication factors, and the one or more processors are further configured to, when executing the code, cause the UE to:
receive, from the network device, a downlink transmission that is compensated for the one or more first types of communication factors and for at least one of the one or more second types of communication factors, wherein the one or more second types of communication factors are different than the one or more first types of communication factors.

24. The UE of claim 21, wherein the request for compensation by the network device for the one or more second types of communication factors is based at least in part on a severity of each of the set of communication factors, wherein the severity of each of the set of communication factors is based at least in part on measuring the downlink channel for the information associated with the set of communication factors.

25. The UE of claim 21, wherein the request for compensation by the network device for the one or more second types of communication factors is based at least in part on estimating the amount of processing resources to be used to process each of the set of communication factors.

26. The UE of claim 21, wherein the one or more processors are further configured to, when executing the code, cause the UE to:
measure the downlink channel between the network device and the UE for updated information associated with the set of communication factors; and
transmit, to the network device, a second request for compensation by the network device for one or more third types of communication factors from the set of communication factors based at least in part on the updated information associated with the set of communication factors and based at least in part on a configuration of the UE.

27. The UE of claim 21, wherein the one or more processors are further configured to, when executing the code, cause the UE to receive, from the network device, a feedback message indicating a confirmation of compensation by the network device for each of the one or more second types of communication factors or a deferment of compensation for each of the one or more second types of communication factors.

28. A network device, comprising:
one or more memories storing processor-executable code; and
one or more processors coupled with the one or more memories and configured to, when executing the code, cause the network device to:
transmit, to a user equipment (UE) during a connection establishment procedure between the UE and the network device, a capability report indicating one or more first types of communication factors for which the network device is capable of compensating downlink communication to the UE;
receive, from the UE, a request for compensation by the network device for one or more second types of communication factors from a set of communication factors based at least in part on a downlink channel between the network device and the UE and an amount of processing resources to compensate, at the UE, for each of the set of communication factors, the one or more second types of communication factors being associated with a greater amount of processing resources relative to a remainder of the set of communication factors; and transmit, to the UE, a downlink transmission that is compensated for at least one of the one or more second types of communication factors.

29. The network device of claim 28, wherein the one or more processors are further configured to, when executing the code, cause the network device to determine that the one or more second types of communication factors will use the greater amount of processing resources at the UE relative to the remainder of the set of communication factors, wherein transmitting the downlink transmission that is compensated for at least the one of the one or more second types of communication factors is based at least in part on the determining.

30. The network device of claim 29, wherein, to determine that the one or more second types of communication factors will use the greater amount of processing resources at the UE relative to the remainder of the set of communication factors, the one or more processors are further configured to, when executing the code, cause the network device to determine that the one or more second types of communication factors will use a greater amount of processing resources at the UE than at the network device.

* * * * *